United States Patent
Nakagawa

(10) Patent No.: US 11,350,037 B2
(45) Date of Patent: May 31, 2022

(54) INFORMATION PROCESSING APPARATUS WITH CONNECTOR TO EXPAND FUNCTION, DISPLAY CONTROL METHOD FOR THE SAME, AND STORAGE MEDIUM STORING PROGRAM

(71) Applicant: CANON KABUSHIKI KAISHA, Tokyo (JP)

(72) Inventor: Koichi Nakagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/663,139

(22) Filed: Oct. 24, 2019

(65) Prior Publication Data

US 2020/0145587 A1 May 7, 2020

(30) Foreign Application Priority Data

Nov. 5, 2018 (JP) .............................. JP2018-208207

(51) Int. Cl.
| | |
|---|---|
| *H04N 5/232* | (2006.01) |
| *G06F 3/04817* | (2022.01) |
| *G06F 3/0482* | (2013.01) |
| *H04N 5/225* | (2006.01) |

(52) U.S. Cl.
CPC ..... *H04N 5/232933* (2018.08); *G06F 3/0482* (2013.01); *G06F 3/04817* (2013.01); *H04N 5/2257* (2013.01)

(58) Field of Classification Search
CPC ............ H04N 5/232933; H04N 5/2257; G06F 3/04817; G06F 3/0482
See application file for complete search history.

(56) References Cited

U.S. PATENT DOCUMENTS

| | | | |
|---|---|---|---|
| 2012/0242845 A1* | 9/2012 | Tan ..................... | H04N 5/23241 348/207.1 |
| 2012/0307091 A1* | 12/2012 | Yumiki .............. | H04N 5/23218 348/211.4 |
| 2012/0309526 A1* | 12/2012 | Nogami .................. | A63F 13/31 463/31 |

FOREIGN PATENT DOCUMENTS

JP          2015-127920 A          7/2015

* cited by examiner

*Primary Examiner* — Antoinette T Spinks
(74) *Attorney, Agent, or Firm* — Canon U.S.A., Inc. IP Division

(57) ABSTRACT

An information processing apparatus includes a connector configured to connect an expansion unit for expanding a function of the information processing apparatus, a detector configured to detect a connection position of the connected expansion unit with respect to the information processing apparatus, a display configured to display a graphical user interface (GUI) for performing a setting related to a function expanded by the connected expansion unit, and a controller configured to control display contents of the GUI to be displayed on the display based on the connection position of the connected expansion unit.

16 Claims, 15 Drawing Sheets

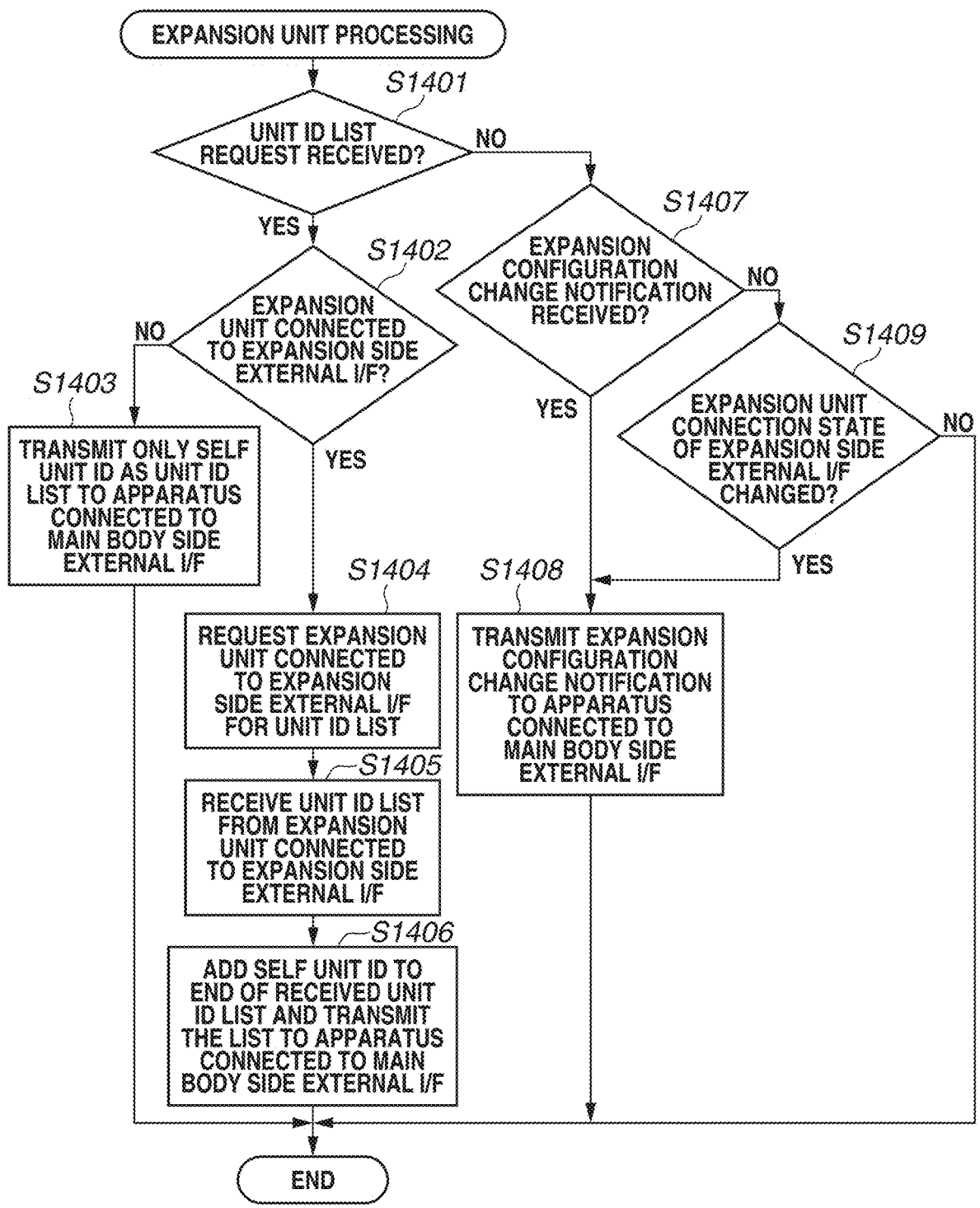

INFORMATION PROCESSING APPARATUS WITH CONNECTOR TO EXPAND FUNCTION, DISPLAY CONTROL METHOD FOR THE SAME, AND STORAGE MEDIUM STORING PROGRAM

BACKGROUND

Field

The present disclosure relates to a technique for controlling display of graphical user interfaces (GUIs) on an information processing apparatus to which external apparatuses are connectable.

Description of the Related Art

In some electronic apparatuses, such as video cameras and digital cameras, connecting an expansion unit for expanding the functions and performance of the electronic apparatus makes it possible to use functions not usable only with the electronic apparatus itself. For example, a certain video camera is capable of connecting with an expansion unit for adding network functions and connecting with an expansion unit for enabling recording in recording media and recording formats different from recording media and recording formats applicable for the main body of the video camera.

Such typical electronic apparatuses are generally capable of displaying hierarchical menus grouped on a function basis in order to perform setting on the apparatus main body. In a case where an expansion unit is connected to such an electronic apparatus, the electronic apparatus generally displays setting items related to the expansion unit at display positions for groups suitable for the functions of the connected expansion unit in the hierarchical menus. However, in this method, it is hard for the user to grasp where the setting items related to the expansion unit are added and displayed in the hierarchical menus. Thus, the user needs to extensively search for the setting items in the hierarchical menus. For this, Japanese Patent Application Laid-Open No. 2015-127920, for example, discusses a technique for displaying, in a case where external apparatuses are determined to be connected to an information processing apparatus, GUIs related to the connected external apparatuses arranged in order of connection.

SUMMARY

In a case where the power of an information processing apparatus is turned on in a state where a plurality of expansion units is connected, for example, connections of the plurality of expansion units may be detected at the same time. In this case, the arrangement of GUIs corresponding to the plurality of the expansion units cannot be determined with the above-described technique of Japanese Patent Application Laid-Open No. 2015-127920. In addition, to determine the correspondence between the expansion units and the GUIs, the user of such a conventional technique would need to memorize the order of connections of the expansion units to the information processing apparatus, which would be very troublesome for the user.

In view of the above-discussed considerations, the present disclosure features, among other things, displaying GUIs corresponding to connected expansion units in an easy-to-understand way.

According to an aspect of the present disclosure, an information processing apparatus includes a connector configured to connect an expansion unit for expanding a function of the information processing apparatus, a detector configured to detect a connection position of the connected expansion unit with respect to the information processing apparatus, a display configured to display a graphical user interface (GUI) for performing a setting related to a function expanded by the connected expansion unit, and a controller configured to control display contents of the GUI to be displayed on the display based on the connection position of the connected expansion unit.

Further features of the present disclosure will become apparent from the following description of exemplary embodiments with reference to the attached drawings.

BRIEF DESCRIPTION OF THE DRAWINGS

FIG. 14 is a flowchart illustrating a flow of processing of a CPU of an expansion unit.

DESCRIPTION OF THE EMBODIMENTS

An exemplary embodiment of the present disclosure will be described in detail below with reference to the accompanying drawings.

Figure 1:
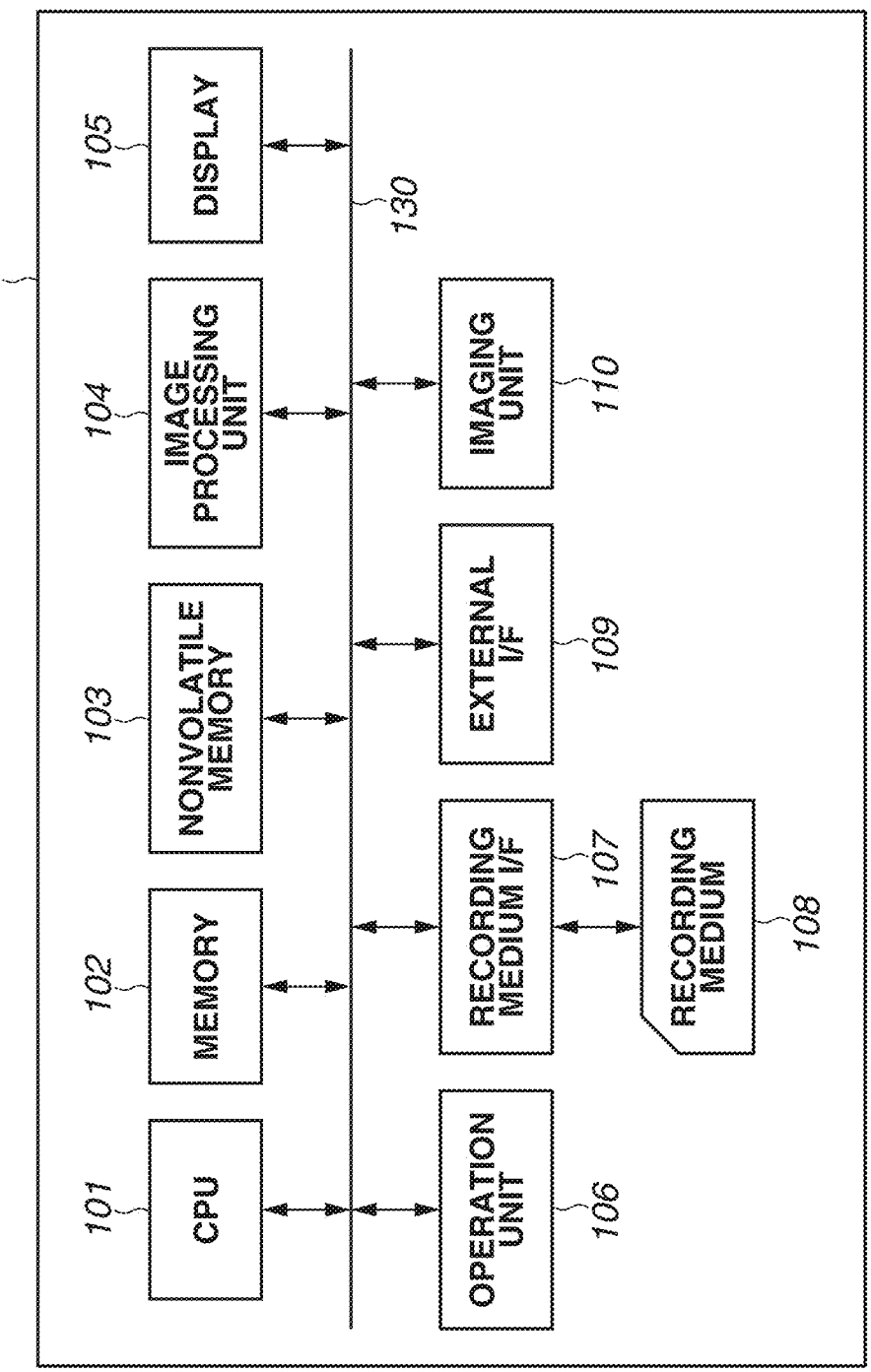
FIG. 1 illustrates a configuration example of a control apparatus.

FIG. 1 schematically illustrates an example of a configuration of an information processing apparatus according to an exemplary embodiment of the present disclosure. The information processing apparatus according to the present exemplary embodiment is capable of controlling graphical user interfaces (GUIs) and expansion units (described below), and thus is hereinafter referred to as a control apparatus 100.

The control apparatus 100 includes a central processing unit (CPU) 101, a memory 102, a nonvolatile memory 103, an image processing unit 104, a display 105, an operation unit 106, a recording medium interface (I/F) 107, an external I/F 109, and an imaging unit 110 which are all connected to an internal bus 130. These units connected to the internal bus 130 are configured to exchange data with each other via the internal bus 130.

The memory 102 includes, for example, a random access memory (RAM), such as a volatile memory using semiconductor elements. The nonvolatile memory 103 stores image data, audio data, and other data and stores various programs necessary for operations of the CPU 101. The nonvolatile memory 103 includes, for example, a hard disk (HD) and a read only memory (ROM). By using the memory 102 as a work memory, for example, the CPU 101 performs various processing and controls each unit of the control apparatus 100 according to a program stored in the nonvolatile memory 103.

Under the control of the CPU 101, the image processing unit 104 performs various image processing on image data stored in the nonvolatile memory 103 and a recording medium 108 and on image data captured by the imaging unit 110. The image processing performed by the image processing unit 104 includes analog-to-digital (A/D) conversion processing and digital-to-analog (D/A) conversion processing, and also includes encoding processing, compression processing, decoding processing, enlargement/reduction (resizing) processing, noise reduction processing, and color conversion processing on image data. The image processing unit 104 may include a dedicated circuit block for performing specific image processing. Depending on the type of image processing, the CPU 101 can perform image processing according to a program without using the image processing unit 104.

The display 105 displays an image and a GUI screen forming a GUI under the control of the CPU 101. Although, in the configuration illustrated in FIG. 1, the display 105 is a display apparatus built in the control apparatus 100, the display 105 may be an external display apparatus, such as an external monitor and a television. In a case where the display 105 is an external display apparatus, the control apparatus 100 itself includes up to an interface for outputting an image signal to be displayed on the display 105. The CPU 101 generates a display control signal according to a program and controls each unit of the control apparatus 100 to generate an image signal to be displayed on the display 105 and output the image signal to the display 105. The display 105 displays an image based on the output image signal.

The operation unit 106 is an input device for receiving user operations, including a text information input device, such as a keyboard, a pointing device, such as a mouse and a touch panel, buttons, dials, a joy stick, a touch sensor, and a touch pad. The touch panel is an input device planarly configured and stacked on top of the display 105, and outputs coordinate information according to a touched position. In a case where the touch panel is included in the operation unit 106, the CPU 101 detects a user operation on the touch panel or the state of the touch panel. According to the present exemplary embodiment, in a case where a user operation is performed on the menu screen to be described below, the operation unit 106 is used to issue an instruction to change a tab, an instruction to select a menu item, and an instruction to execute the selected menu item.

The recording medium 108, such as a memory card, a compact disc (CD), and a digital versatile disc (DVD), is attachable to the recording medium I/F 107. Under the control of the CPU 101, the recording medium I/F 107 writes and reads data to and from the recording medium 108.

The external I/F 109, to which an external expansion unit (described below) is attachable, serves as an interface for outputting and inputting an image signal, an audio signal, and a control signal to and from the expansion unit.

The imaging unit 110 is a camera unit including an image sensor, such as a charge coupled device (CCD) sensor and a complementary metal-oxide semiconductor (CMOS) sensor, a zoom lens, a focus lens, a shutter, a diaphragm, a distance measurement unit, and an analog-to-digital (A/D) converter. The imaging unit 110 is capable of capturing still and moving images. Image data about captured still and moving images is transmitted to the image processing unit 104, undergoes coding processing, and recorded in the recording medium 108 as a still image file and a moving image file, respectively.

The control apparatus 100 may include a communication I/F (not illustrated) as an interface for communicating with an external apparatus and the Internet to transmit and receive files, commands, and other various data.

Figure 2:
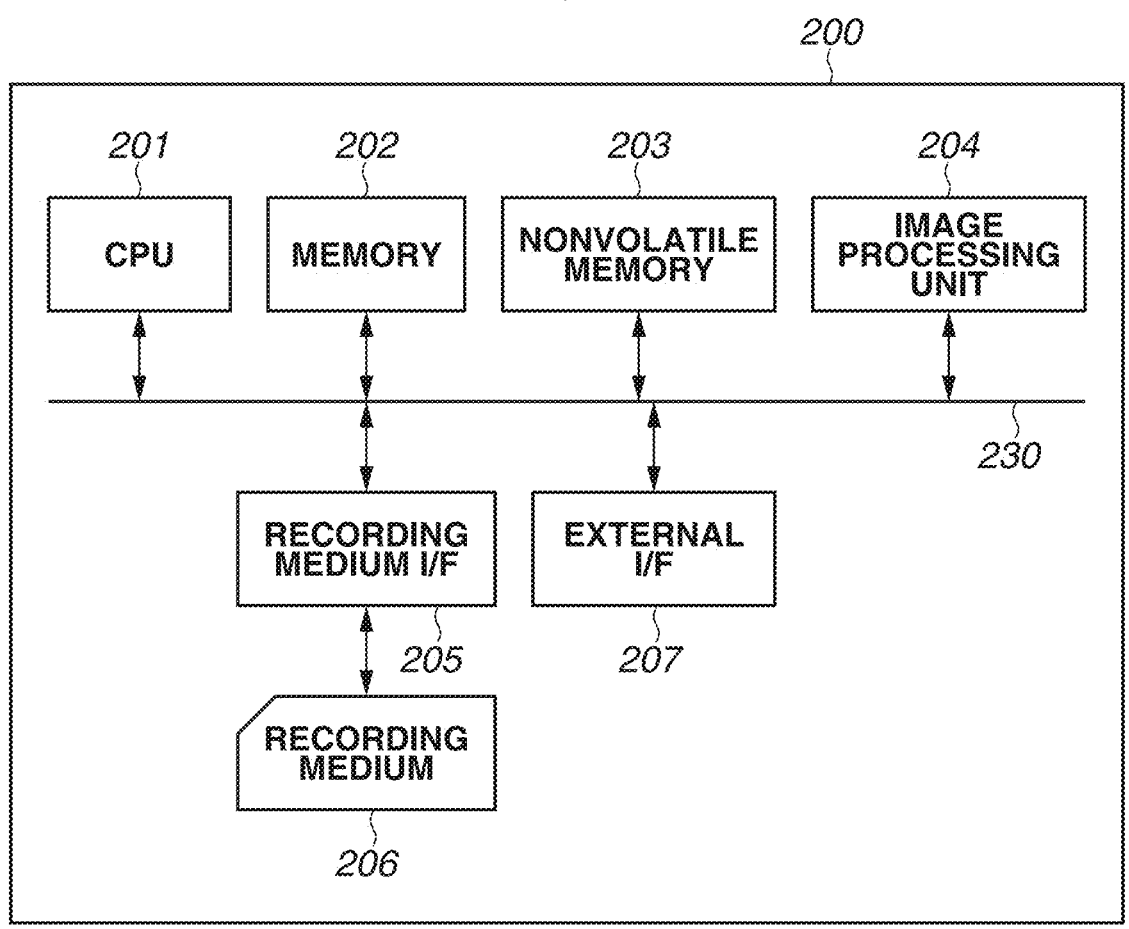
FIG. 2 illustrates a configuration example of an expansion unit A.

FIG. 2 illustrates a configuration example of an expansion unit A200 which is connectable to the control apparatus 100 or another expansion unit and expands the functions of the control apparatus 100. According to the present exemplary embodiment, functional expansions of the control apparatus 100 include not only adding a function that the control apparatus 100 does not have, but also improving the performance of existing functions of the control apparatus 100.

The expansion unit A200 includes a CPU 201, a memory 202, a nonvolatile memory 203, an image processing unit 204, a recording medium I/F 205, and an external I/F 207 which are all connected to an internal bus 230. These units connected to the internal bus 230 are configured to exchange data with each other via the internal bus 230. The CPU 201 to the nonvolatile memory 203, the recording medium I/F 205, and a recording medium 206 have the same configurations and functions as those of the CPU 101 to the nonvolatile memory 103, the recording medium I/F 107, and the recording medium 108 illustrated in FIG. 1, respectively, and redundant descriptions thereof will be omitted.

Under the control of CPU 201, the image processing unit 204 performs various image processing on image data stored in the nonvolatile memory 203 and the recording medium 206 and on image data input from the external I/F 207. The image processing performed by the image processing unit 204 includes A/D conversion processing and D/A conversion processing, and also includes encoding processing, compression processing, decoding processing, enlargement/reduction (resizing) processing, noise reduction processing, and color conversion processing on image data. The image processing unit 204 may include a dedicated circuit block for performing specific image processing. Depending on the type of image processing, the CPU 201 can perform image processing according to a program without using the image processing unit 204.

The external I/F 207 includes a main body side external I/F and an expansion side external I/F. The control apparatus 100 or another expansion unit is attachable to the main body side external I/F which enables input and output of an image signal, an audio signal, and a control signal from and to the control apparatus 100 or another expansion unit. Another expansion unit is attachable to the expansion side external I/F which enables input and output of an image signal, an audio signal, and a control signal from and to the other expansion unit. The control apparatus 100 is not connectable to the expansion side external I/F.

Figure 3:
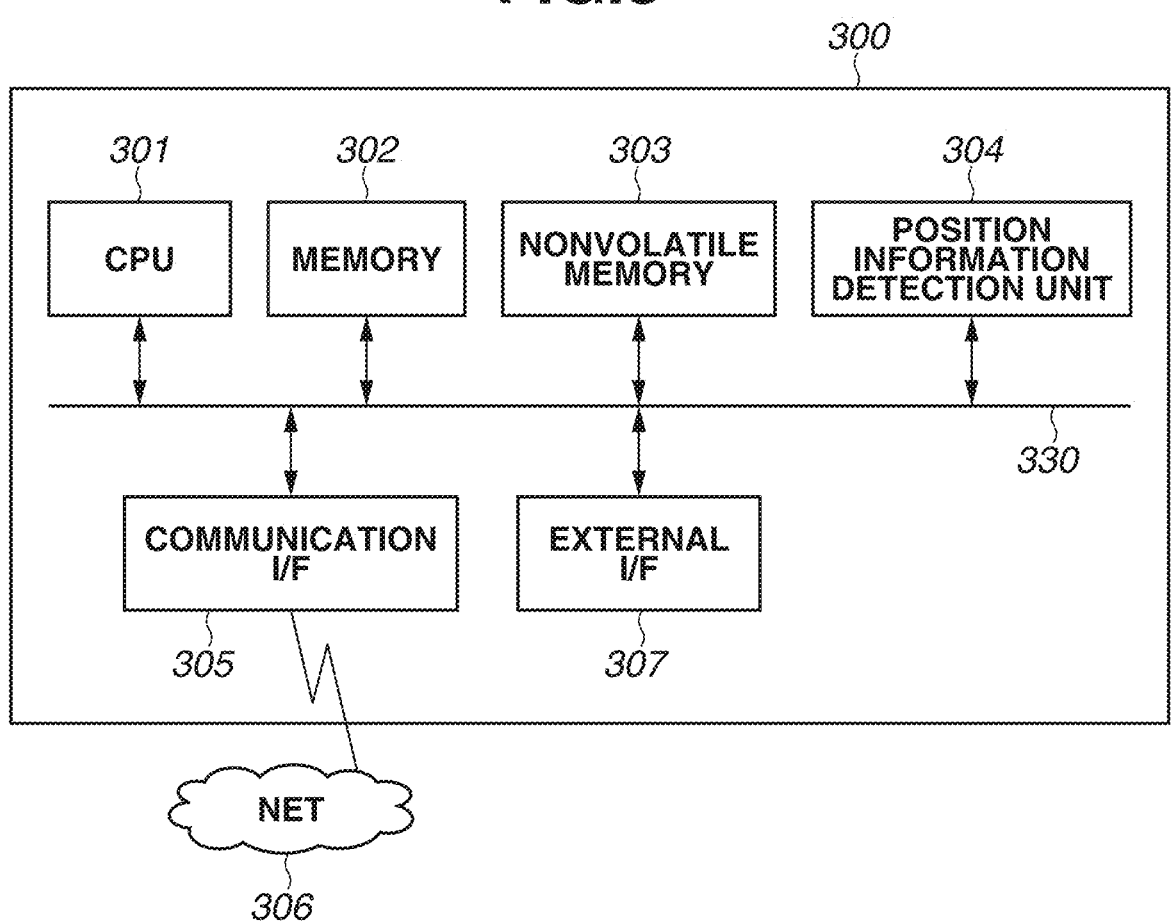
FIG. 3 illustrates a configuration example of an expansion unit B.

FIG. 3 illustrates a configuration example of an expansion unit B300 which is connectable to the control apparatus 100 or another expansion unit and expands the functions of the control apparatus 100.

The expansion unit B300 includes a CPU 301, a memory 302, a nonvolatile memory 303, a position information detection unit 304, a communication I/F 305, and an external I/F 307 which are all connected to an internal bus 330. These units connected to the internal bus 230 are configured to exchange data with each other via the internal bus 230. The CPU 301 to the nonvolatile memory 303 have the same configurations and functions as those of the CPU 101 to the nonvolatile memory 103 illustrated in FIG. 1, respectively, and redundant descriptions thereof will be omitted. The external I/F 307 has the same configuration and function as the external I/F 207 illustrated in FIG. 2, and redundant descriptions thereof will be omitted.

The position information detection unit 304 includes a Global Positioning System (GPS) receiver for receiving electric waves from a plurality of GPS satellites, and a positioning unit for measuring the current position of the expansion unit B300. The CPU 301 can perform positioning calculation according to a program, in place of the positioning unit.

The communication I/F 305 is an interface for communicating with an external apparatus and the Internet 306 to transmit and receive files, commands, and other various data.

Each of the expansion units A200 and B300 are assigned a unit identifier (ID) for distinguishing the expansion unit to which the control apparatus 100 is connected. It is assumed that the expansion unit A200 is assigned a unit ID "1", and the expansion unit B300 is assigned a unit ID "2". The unit ID is stored in the nonvolatile memory of each expansion unit.

The following descriptions will be made on the premise that two different types of recording media, such as CFast (registered trademark) and a secure digital (SD) card, are attachable to the recording medium I/F 107 of the control apparatus 100 and that only a Solid State Drive (SSD) as a recording medium is attachable to the recording medium I/F 205 of the expansion unit A200. According to the present exemplary embodiment, the functions and performance of the control apparatus 100 can be expanded by connecting the above-described expansion units to the control apparatus 100. For example, in a case where the expansion unit A200 is connected to the control apparatus 100, the control apparatus 100 becomes capable of recording an image in an SSD and outputting an image via a 3G-SDI terminal. For example, in a case where the expansion unit B300 is connected to the control apparatus 100, network functions are added to the control apparatus 100. In such a case, it becomes possible to connect to the control apparatus 100 from a terminal, such as a personal computer (PC) and a smart phone, via a network and control the control apparatus 100 by using a web browser on the terminal (this function is referred to as a browser remote function). In this case, since a GPS function is also added and accordingly electric waves from GPS satellites are received by the expansion unit B300, the control apparatus 100 becomes capable of measuring the current position and obtaining the current time. This enables the control apparatus 100 to record, together with a recorded image, position information at the time of image recording, and automatically set the current time.

To an expansion unit already connected to the control apparatus 100, another expansion unit can be further connected via the expansion side external I/F of the existing expansion unit. This configuration enables adding not only functions of one expansion unit but also functions and performance of a plurality of expansion units to the control apparatus 100.

Figure 4A:
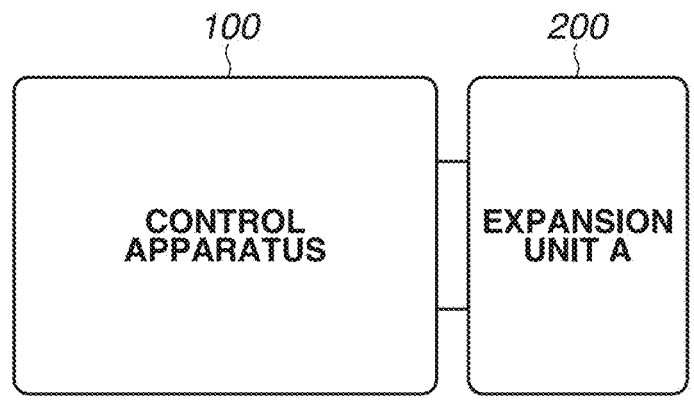
FIGS. 4A, 4B, 4C, and 4D are layout drawings illustrating examples of connection patterns of the control apparatus and the expansion units.
Figure 4B:
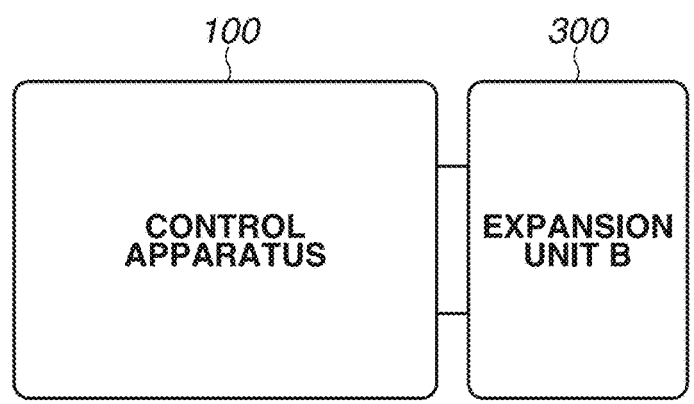
Figure 4C:
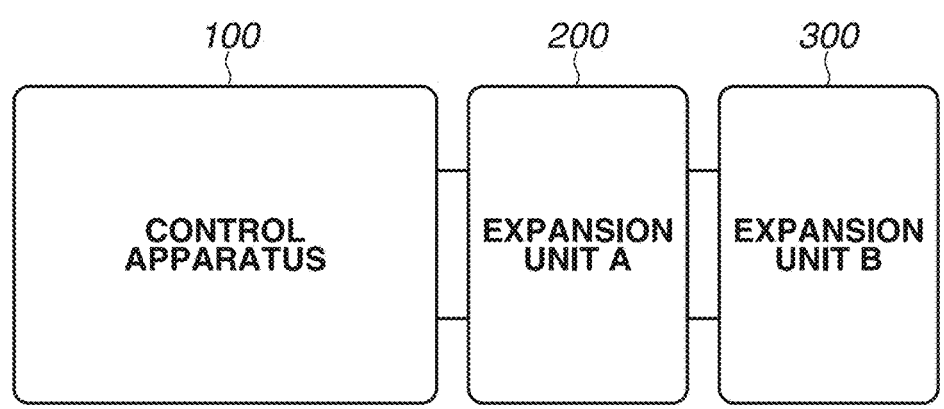
Figure 4D:
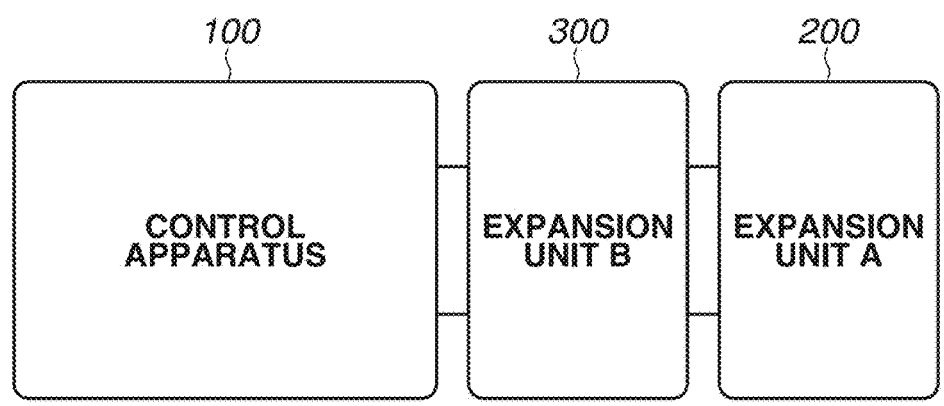

FIGS. 4A to 4D illustrate examples of connection patterns of the control apparatus 100, the expansion unit A200, and the expansion unit B300. FIG. 4A illustrates a state where only the expansion unit A200 is connected to the control apparatus 100. FIG. 4B illustrates a state where only the expansion unit B300 is connected to the control apparatus 100. FIG. 4C illustrates a state where the expansion unit A200 is connected to the control apparatus 100, and the expansion unit B300 is connected to the expansion unit A200 in series. FIG. 4D illustrates a state where the expansion unit B300 is connected to the control apparatus 100, and the expansion unit A200 is connected to the expansion unit B300 in series.

In this example, the control apparatus 100 can display a menu screen (described below) on the display 105 in response to a user operation on the menu button of the operation unit 106, and receive a user operation via the menu screen. In response to the user operation via the menu screen, the user can set and check the functions and performance of the control apparatus 100. According to the present exemplary embodiment, the setting of the functions expanded by the expansion unit includes executing the functions, checking the states of the functions or performance, and changing the functions or performance.

The menu items displayed on the menu screen are divided into menu item groups for each category (described below). Tabs (described below) are displayed in the menu screen. When the user selects a tab displayed at the upper part of the screen, the control apparatus 100 can change the group to be displayed based on the selected tab. An icon illustrating the group is displayed at the center of each tab.

Figure 5A:
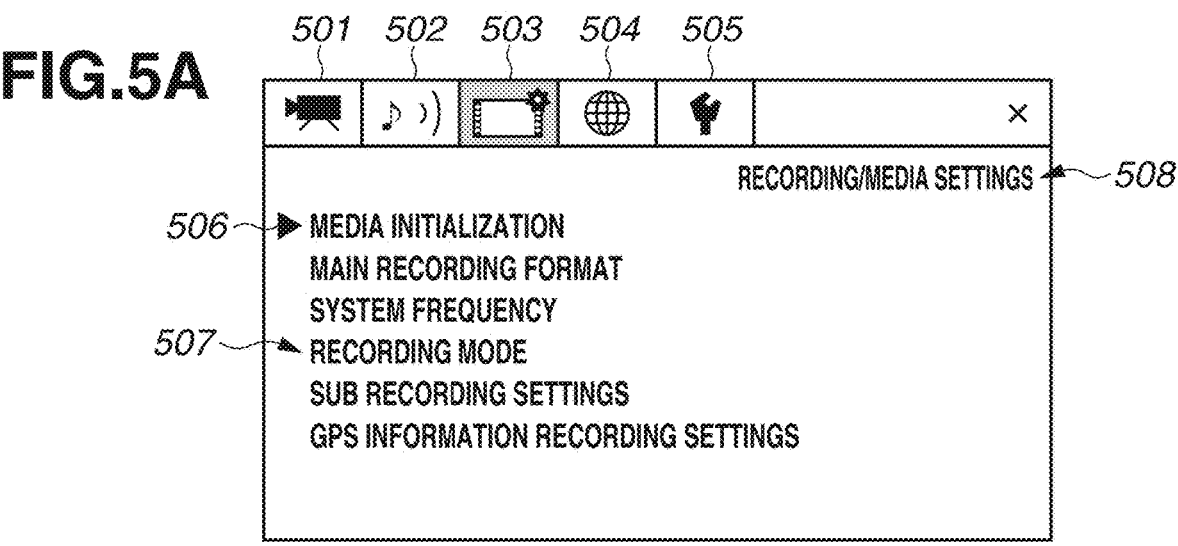
FIGS. 5A, 5B, and 5C illustrate display examples of menus.
Figure 5B:
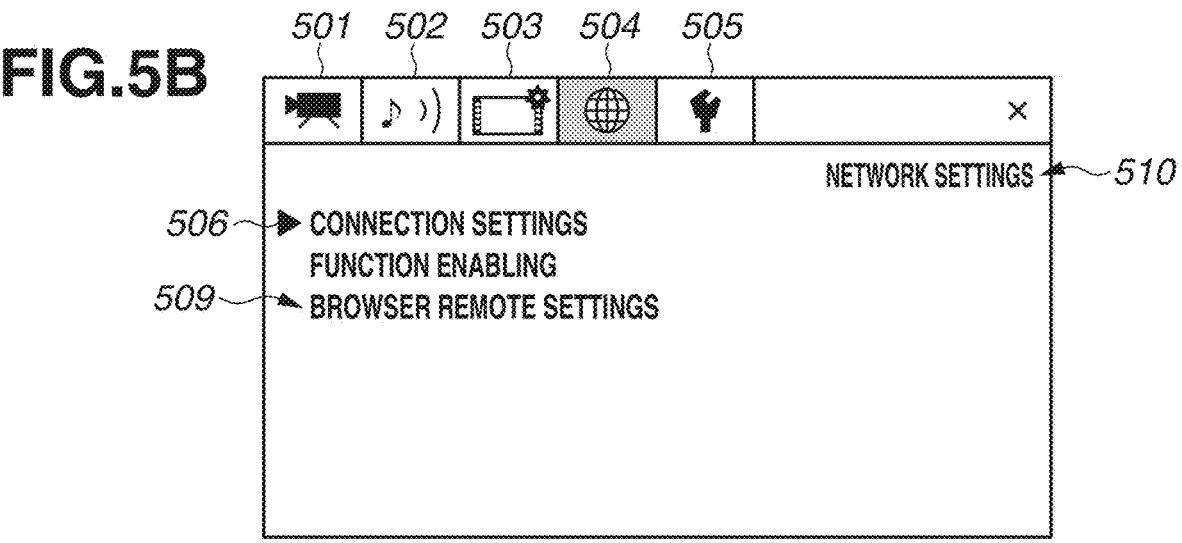
Figure 5C:
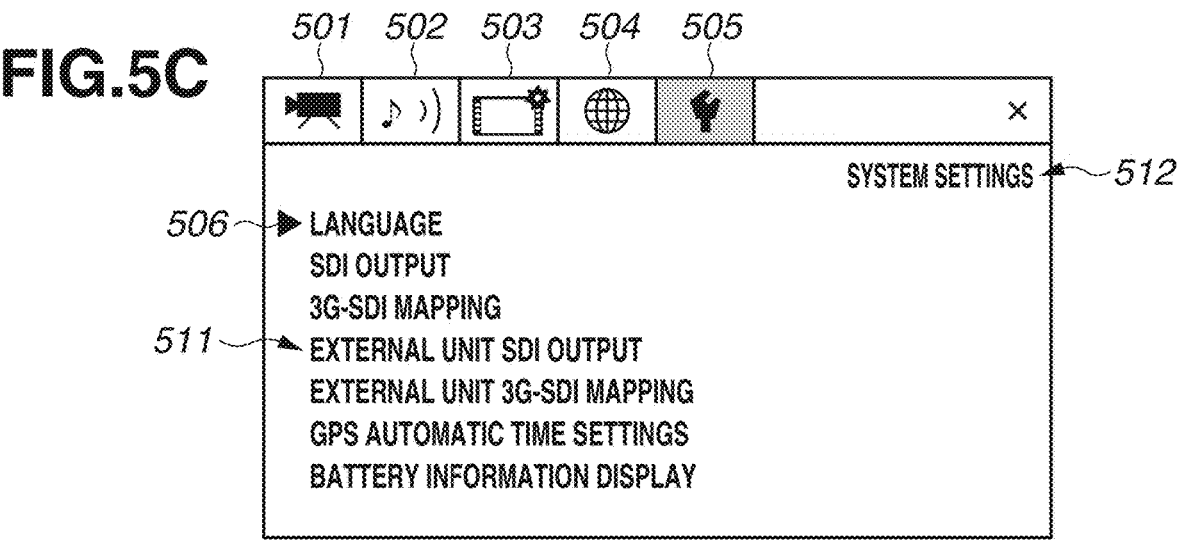

FIGS. 5A to 5C illustrate examples of menus in the menu screen displayed on the display 105 when no expansion unit is connected to the control apparatus 100.

FIG. 5A illustrates a display example of the recording/media setting menu including recording format setting, media initialization, and other settings related to recording and media. A camera setting tab 501 is a tab including setting menus for camera functions. An audio setting tab 502 is a tab including setting menus for sound functions. A recording/media setting tab 503 is a tab including setting menus for recording and media. A network setting tab 504 is a tab including setting menus for network functions. A system setting tab 505 is a tab including setting menus for system functions. The camera setting tab 501 to the system setting tab 505 are arranged, for example, in the setting menu tab display area at the upper part of the menu screen.

In the example illustrated in FIG. 5A, the recording/media setting tab 503 is highlighted, indicating a state where recording/media settings are enabled, or focused. When the user issues a tab change instruction via the operation unit 106, for example, by pressing the tab change right key or tab change left key, the control apparatus 100 changes the focus to the tab to the right or left of the currently focused tab in response to the tab change instruction.

When the user issues an instruction for moving the cursor 506 in the menu screen, by pressing the up or down key of the operation unit 106 and then pressing the SET key, the control apparatus 100 recognizes that the menu item corresponding to these key operations is selected by the user. FIG. 5A illustrates an example in which the cursor 506 points the media initialization menu item. In this case, the control apparatus 100 displays the menu items related to recording/media settings as menu items 507 and displays a menu group name 508 which indicates that the currently displayed menu items are recording/media settings.

Likewise, FIG. 5B illustrates a display example of the network setting menu. In the example illustrated in FIG. 5B, the network setting tab 504 is highlighted, indicating a state where network settings are enabled (focused). In the example illustrated in FIG. 5B, the cursor 506 points the connection setting menu item. The control apparatus 100 displays menu items 509 related to network settings and displays a menu group name 510 indicating network settings.

FIG. 5C illustrates a display example of the system setting menu. In the example illustrated in FIG. 5C, the system setting tab 505 is highlighted, indicating a state where system settings are enabled (focused). In the example illustrated in FIG. 5C, the cursor 506 points the language menu item. The control apparatus 100 displays menu items 511 related to system settings, and a menu group name 512 indicates system settings.

In a case where an expansion unit for expanding the functions of the apparatus main body is connected, the control apparatus 100 according to the present exemplary embodiment detects the connection position of the expansion unit with respect to the control apparatus 100. The control apparatus 100 displays on the display 105 GUI items for settings related to the functions expanded by the expansion units, in correspondence with one or more connected expansion units. In this case, based on the connection positions of the connected expansion units, the control apparatus 100 can control the display positions of GUI items related to settings of the functions expanded by the expansion units.

FIGS. 6A to 6F illustrate display examples of menus when the expansion unit A200 and the expansion unit B300 are connected to the control apparatus 100.

Figure 6A:
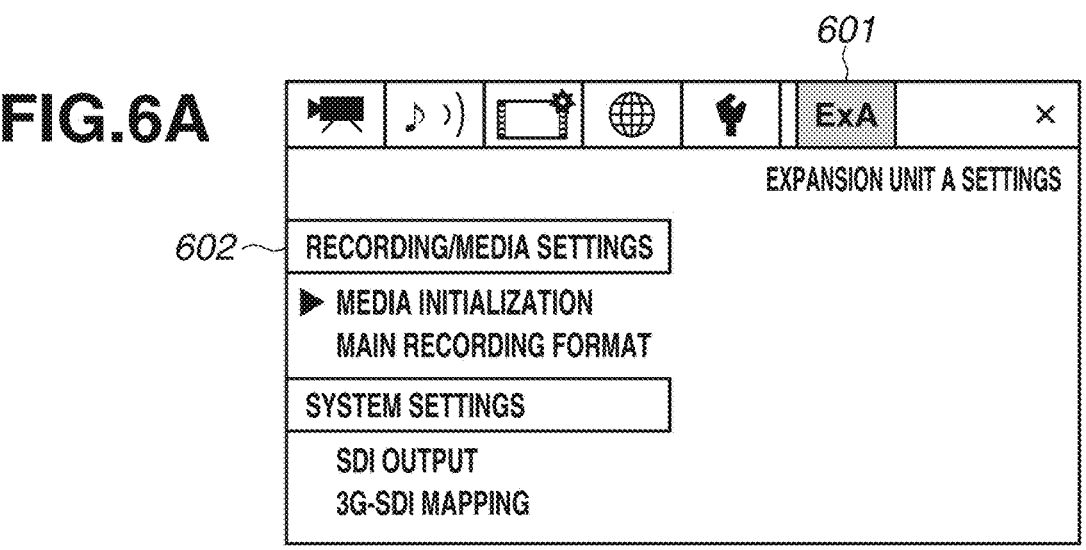
FIGS. 6A, 6B, 6C, 6D, 6E, and 6F illustrate display examples of menus when the expansion units are connected to the control apparatus.

FIG. 6A illustrates a display example of menus when only the expansion unit A200 is connected to the control apparatus 100, as illustrated to FIG. 4A. When only the expansion unit A200 is connected, the control apparatus 100 displays an expansion unit A tab 601 indicating the expansion unit A200, for example, to the right of the setting menu tab display area ranging from the camera setting tab to the system setting tab. Here, a gap is provided between the setting menu tab display area and the expansion unit A tab 601 to make it easier for the user to recognize that the tab corresponding to the settings of the expansion unit A200 is the setting of the expansion unit connected to the control apparatus 100. The control apparatus 100 groups menu items related to the expansion unit A200 by category and displays a label 602 indicating the name of the group of the menu items related to the expansion unit A200 in the menu screen.

Figure 6B:
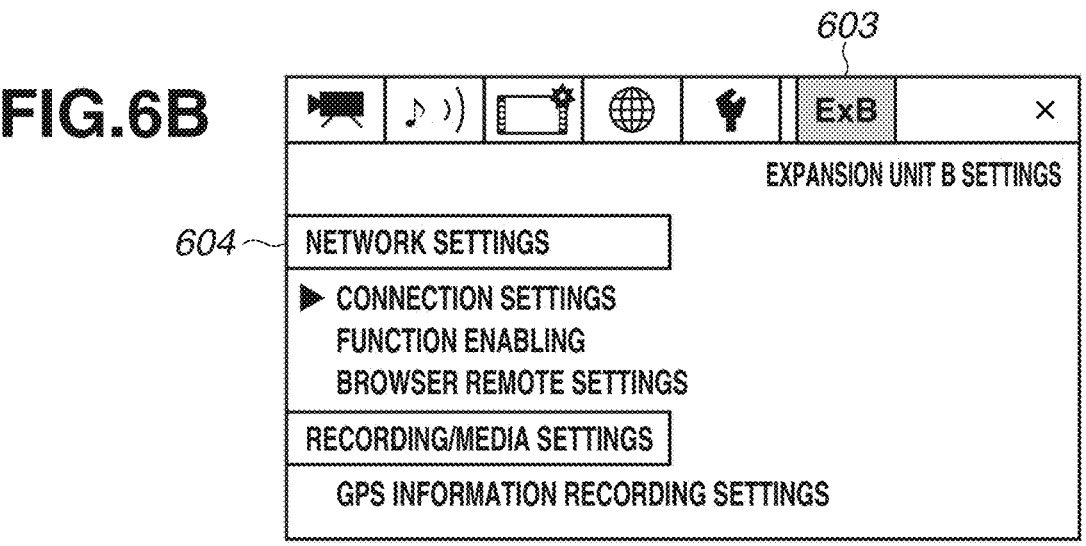

FIG. 6B illustrates a display example of menus in a case where only the expansion unit B300 is connected to the control apparatus 100, as illustrated in FIG. 4B. In a case where only the expansion unit B300 is connected, the control apparatus 100 displays an expansion unit B tab 603 indicating the expansion unit B300 to the right of the setting menu tab display area. The control apparatus 100 groups menu items related to the expansion unit B300 by category and displays a label 604 indicating the name of the group of the menu items related to the expansion unit B300 in the menu screen.

Figure 6C:
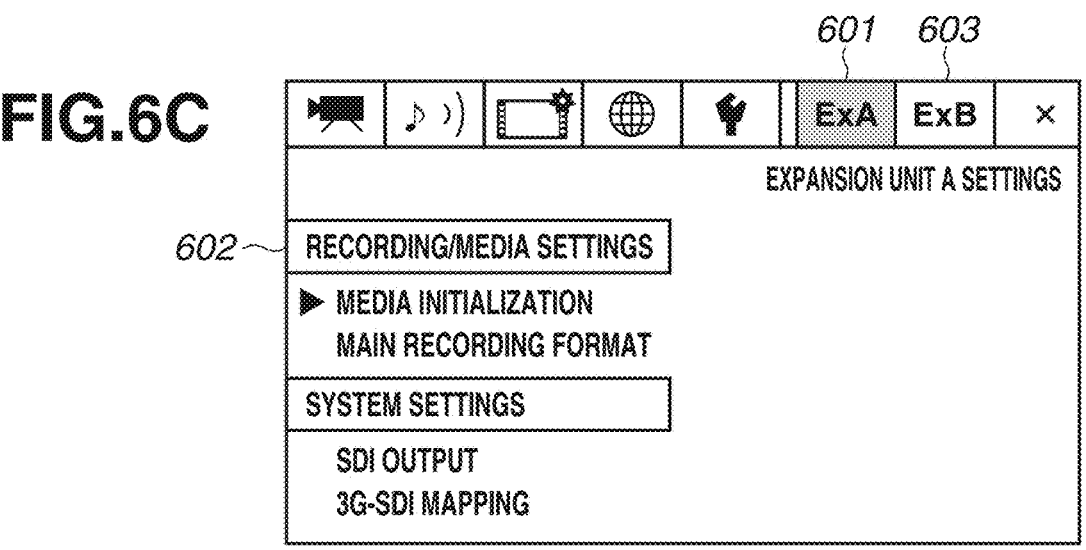
Figure 6D:
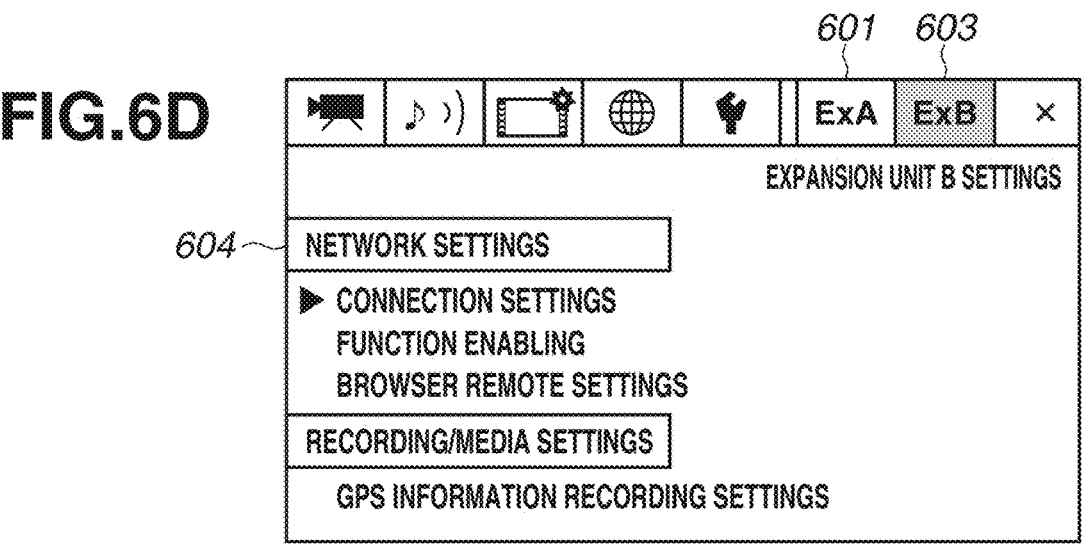

FIGS. 6C and 6D illustrate display examples of menus in a case where the expansion unit A200 is connected to the control apparatus 100, and the expansion unit B300 is connected to the expansion unit A200 in series, as illustrated in FIG. 4C. In this case, the control apparatus 100 displays the expansion unit A tab 601 indicating the expansion unit A200 to the right of the setting menu tab display area and displays the expansion unit B tab 603 indicating the expansion unit B300 to the right of the expansion unit A tab 601. In the example illustrated in FIG. 6C, the expansion unit A tab 601 is highlighted, indicating a state where menu item settings for the expansion unit A200 are enabled (focused). In a case where the expansion unit A tab 601 is highlighted, the control apparatus 100 displays menu items related to the expansion unit A200 on a group basis and displays the label 602 indicating the group name. In the example illustrated in FIG. 6D, the expansion unit B tab 603 is highlighted, indicating a state where menu item settings for the expansion unit A200 are enabled. In a case where the expansion unit B tab 603 is highlighted, the control apparatus 100 displays menu items related to the expansion unit B300 on a group basis and displays the label 604 indicating the group name.

Figure 6E:
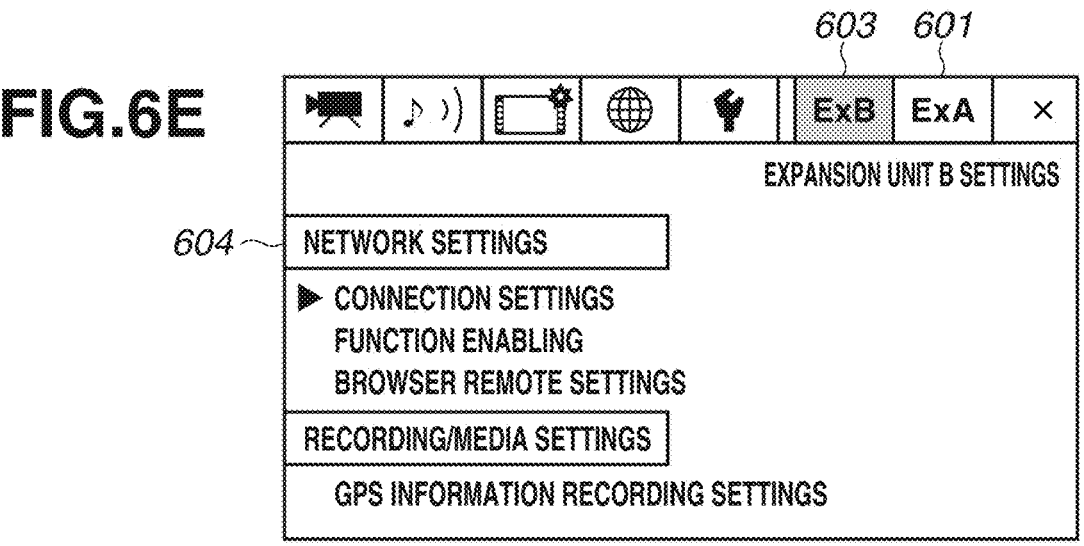
Figure 6F:
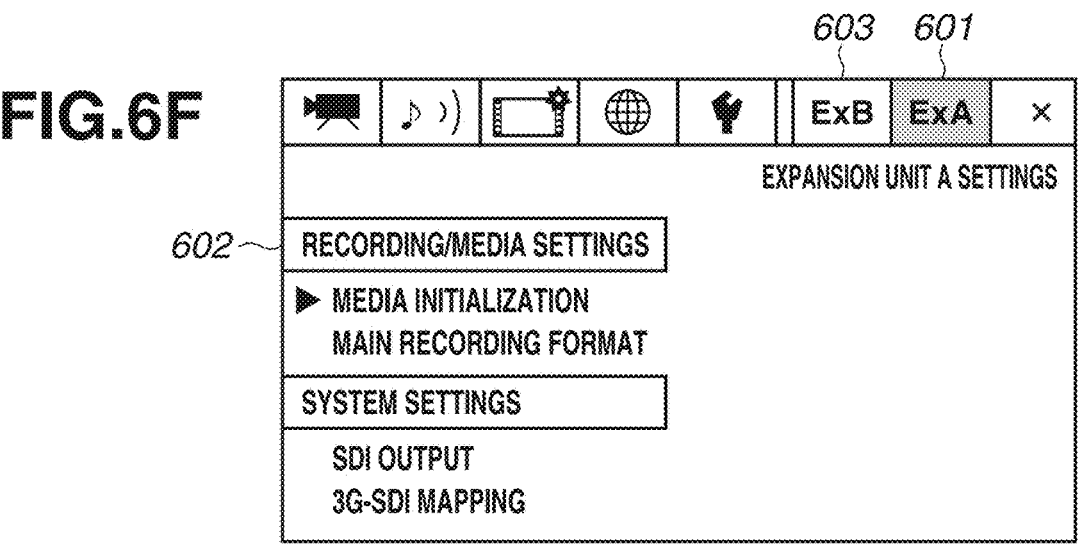

FIGS. 6E and 6F illustrate a display example of menus when the expansion unit B300 is connected to the control apparatus 100, and the expansion unit A200 is connected to the expansion unit B300 in series, as illustrated in FIG. 4D. In this case, the control apparatus 100 displays the expansion unit B tab 603 to the right of the setting menu tab display area and displays the expansion unit A tab 601 to the right of the expansion unit B tab 603. The display examples illustrated in FIGS. 6E and 6F are similar to those illustrated in FIGS. 6C and 6D. The control apparatus 100 displays group-based menu items and labels related to the expansion unit based on any one highlighted expansion unit tab.

In a case where an expansion unit is connected, the control apparatus 100 according to the present exemplary embodiment displays the expansion unit tabs corresponding to the expansion unit in the order corresponding to the positional relation for the control apparatus 100, in the menu screen. This enables the user viewing the menu screen to easily grasp which expansion unit's settings correspond to which expansion unit tab.

When the user issues an instruction to move the cursor 506 by pressing the up or down key via the operation unit 106 while the menu screen is displayed, the control apparatus 100 moves the cursor 506 up or down, respectively, in response to the instruction. When the user further presses the SET key via the operation unit 106, the control apparatus 100 displays sub items included in the menu item at the current cursor position. At this timing, the control apparatus 100 erases the cursor 506 displayed on the left of the menu item and changes the cursor display position to the left of sub items. Further, the control apparatus 100 keeps displaying only the menu item at the current cursor position and erases the other menu items currently displayed. However, the control apparatus 100 keeps displaying the label indicating the name of the group of the selected menu item.

When the user presses the up or down key via the operation unit 106 in a state where sub items are displayed, the control apparatus 100 moves the cursor 506 displayed on the left of sub items up or down, respectively. Then, when the user presses the SET key via the operation unit 106, the control apparatus 100 performs the operation corresponding to the sub item at the current cursor position.

Operations corresponding to the above-described sub items include executing a function of changing setting values related to the control of the control apparatus 100, and executing a function of initializing a medium.

Figure 7A:
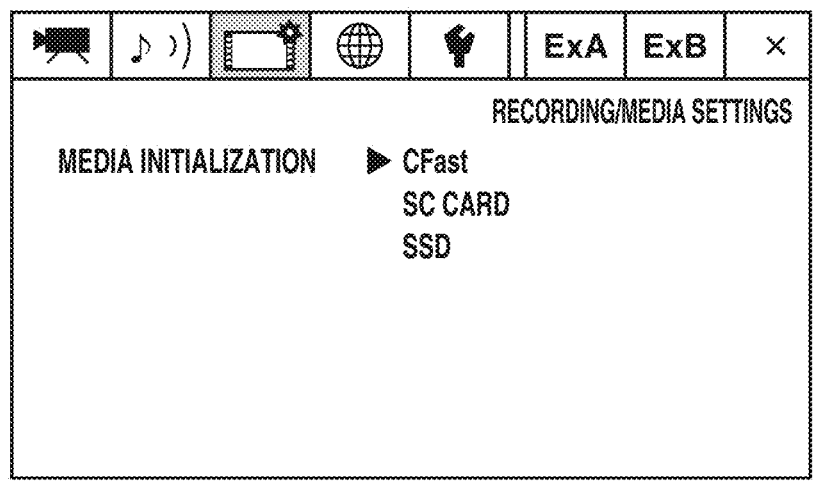
FIGS. 7A, 7B, and 7C illustrate display examples of menus when sub items for menu items are displayed.
Figure 7B:
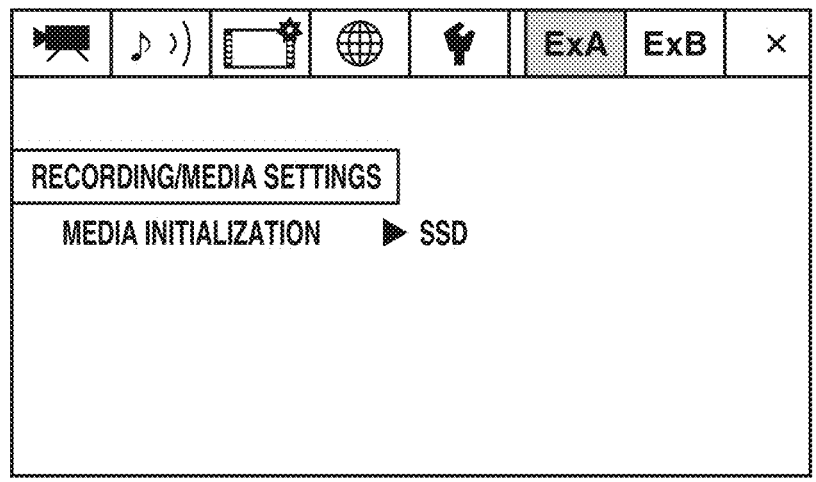
Figure 7C:
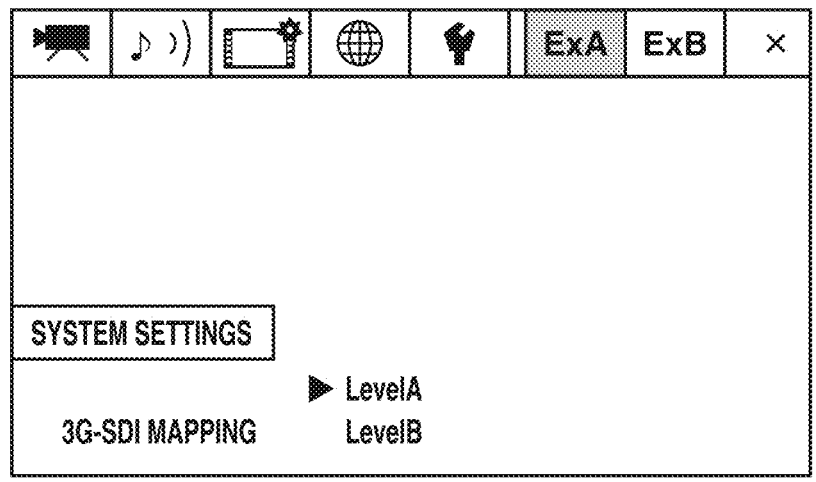

FIGS. 7A to 7C illustrate display examples of menus when sub items are displayed in a menu item.

FIG. 7A illustrates a display example of sub items for the media initialization menu item in the recording/media setting tab. "Media Initialization" is a menu item for initializing a recording medium attached to the recording medium I/F 107 of the control apparatus 100 or the recording medium I/F 205 of the expansion unit A200. In this example, display examples of the sub items include CFast (registered trademark) as a recording medium attachable to the control apparatus 100, an SD card, and an SSD as a recording medium attachable to the expansion unit A200. When the user inputs an instruction to select any one of the sub items via the operation unit 106, the control apparatus 100 performs the initialization of the recording medium corresponding to the selected medium.

FIG. 7B illustrates a display example of the sub items for the media initialization menu item in the tab corresponding to the expansion unit A200. Referring to the example illustrated in FIG. 7B, unlike the example illustrated in FIG. 7A, only "SSD" is displayed as a sub item because only an SSD is a recording medium attachable to the expansion unit A200. In this way, when accessing each menu item from the tab corresponding to the expansion unit A200, only sub items related to the expansion unit A200 are displayed. This reduces the number of steps the user needs to perform to select the target sub item from among other sub items.

Even when each menu item is accessed from the tab corresponding to the expansion unit A200, items other than sub items related to the expansion unit A200 may be displayed.

FIG. 7C illustrates a display example of sub items for the 3G-SDI mapping menu item in the tab corresponding to the expansion unit A200. Referring to the example illustrated in FIG. 7C, unlike the example illustrated in FIG. 7B, the label of system settings as the group to which 3G-SDI mapping belongs is displayed as a label indicating the name of the group.

According to the present exemplary embodiment, in a layout drawing illustrating the control apparatus 100 and the expansion units 200 and 300, GUI items related to settings of functions expanded by an expansion unit may be displayed by using a symbol representing the control apparatus 100 or each expansion unit.

In displaying menu item groups related to an expansion unit, the control apparatus 100 may separately display menu items by category and display a display item indicating the category thereof in the vicinity of the menu items. The menu item groups related to the expansion unit are also displayed in the menu item groups related to settings of the functions of the main body of the control apparatus 100.

Common menu items may exist between the menu item groups related to an expansion unit and the menu item groups related to the settings of the functions of the apparatus main body. In this case, when the user accesses a common menu item out of the menu item groups related to the expansion unit, the control apparatus 100 displays only sub items related to the expansion unit out of sub items of the common menu items. In addition, when the user accesses a common menu item out of the menu item groups related to settings of the functions of the apparatus main body, the control apparatus 100 displays only sub items related to the apparatus main body out of all of sub items of the common menu item or out of sub items of the common menu items.

A flow of processing performed by the CPU 101 of the control apparatus 100 will be described below.

Figure 8:
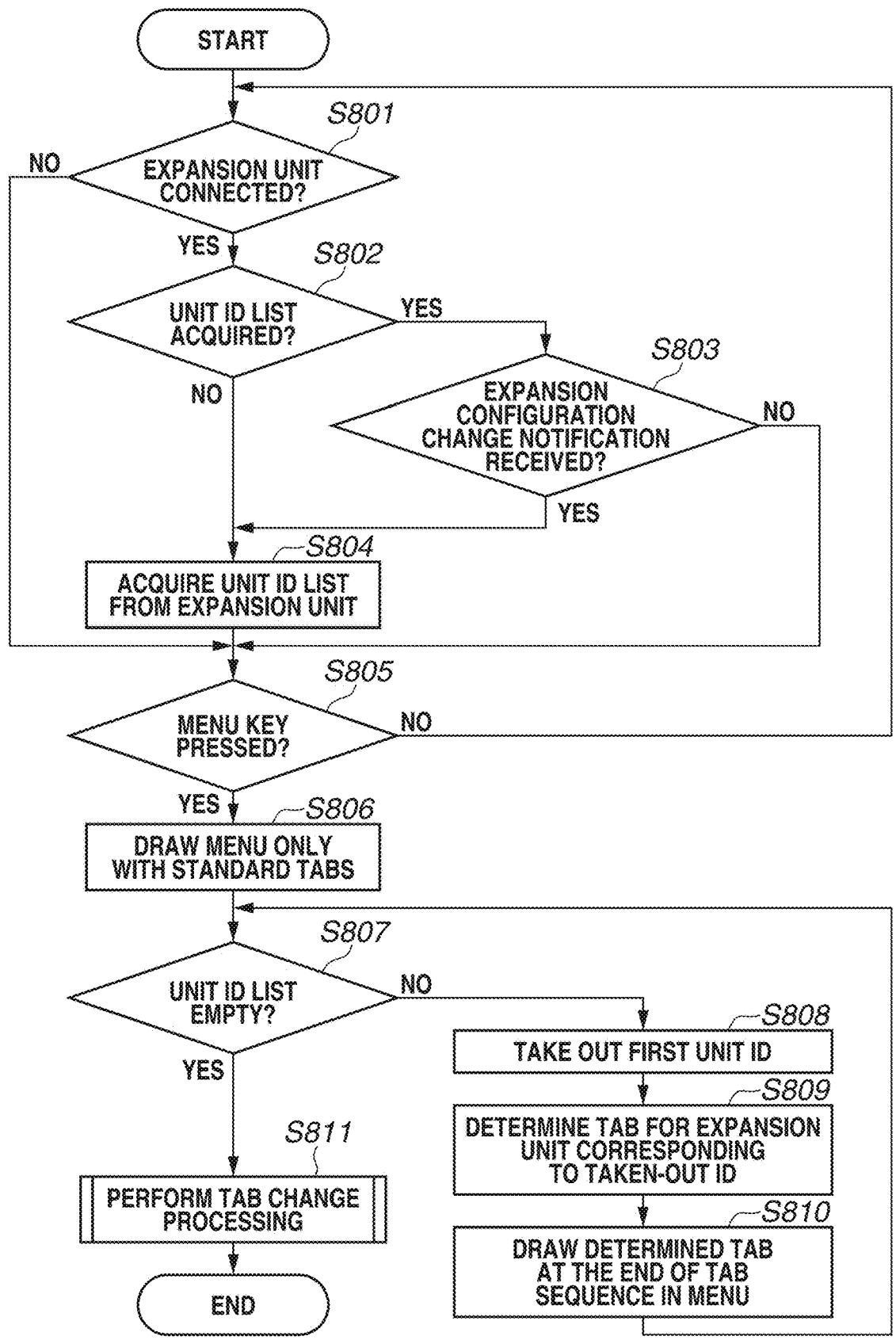
FIG. 8 is a flowchart illustrating a flow of processing of a central processing unit (CPU).

FIG. 8 is a flowchart illustrating processing to be performed by the CPU 101 when the control apparatus 100 displays the menu screen. It is assumed that the processing of the flowchart illustrated in FIG. 8 is implemented when the CPU 101 of the control apparatus 100 executes a program according to the present exemplary embodiment.

All of processing of the flowchart illustrated in FIG. 8 may be implemented by hardware configurations. Alternatively, part of processing may be implemented by hardware configurations and the remaining part of processing may be implemented by software configurations based on programs.

In step S801, the CPU 101 determines whether an expansion unit (the expansion unit A200 or B300 according to the present exemplary embodiment) is connected to the external I/F 109. If the CPU 101 determines that an expansion unit is connected (YES in step S801), the processing proceeds to step S802. If the CPU 101 determines that no expansion unit is connected (NO in step S801), the processing proceeds to step S805.

In step S802, the CPU 101 determines whether a unit ID list is acquired from the expansion unit connected to the external I/F 109. The unit ID list refers to data in list form for indicating the positions and types of expansion units currently connected to the control apparatus 100. A unit ID list is information generated in processing performed by the CPU of each expansion unit. Processing for generating a unit ID list will be described in detail below. If the CPU 101 determines that a unit ID list is not acquired (NO in step S802), the processing proceeds to step S804. If the CPU 101 determines that a unit ID list is acquired (YES in step S802), the processing proceeds to step S803.

In step S803, the CPU 101 determines whether an expansion configuration change notification is received from the expansion unit connected to the external I/F 109. In the event that another expansion unit is connected, any one of connected expansion units is disconnected, or the order of connection is changed in the expansion units connected to the control apparatus 100, the expansion unit transmits the expansion configuration change notification to the control apparatus 100 to notify the control apparatus 100 of the event. If the CPU 101 determines that an expansion configuration change notification is received (YES in step S803), the processing proceeds to step S804. If the CPU 101 determines that an expansion configuration change notification is not received (NO in step S803), the processing proceeds to step S805.

In step S804, the CPU 101 acquires a unit ID list from the expansion unit connected to the external I/F 109. More specifically, the CPU 101 transmits a unit ID list request command to an expansion unit connected to the external I/F 109. The CPU 101 receives a unit ID list from the expansion unit via the external I/F 109 and writes the unit ID list in the memory 102. The processing proceeds to step S805.

In step S805, the CPU 101 determines whether the user issues an instruction to display the menu screen via the operation unit 106, more specifically, whether the user presses the menu key provided to the operation unit 106. If the CPU 101 determines that the menu key is pressed (YES in step S805), the processing proceeds to step S806. If the CPU 101 determines that the menu key is not pressed (NO in step S805), the processing returns to step S801.

In step S806, the CPU 101 displays the menu screen by drawing only standard tabs. More specifically, the CPU 101 reads a standard tab configuration from the memory 102 and instructs the image processing unit 104 to draw tabs with icons corresponding to the tab configuration. The processing then proceeds to step S807.

In step S807, the CPU 101 determines whether the unit ID list acquired in step S804 is empty. If the CPU 101 determines that the unit ID list is empty (YES in step S807), the processing proceeds to step S811. If the CPU 101 determines that the unit ID list is not empty (NO in step S807), the processing proceeds to step S808.

In step S808, the CPU 101 takes out the first unit ID from the unit ID list. More specifically, the CPU 101 reads the unit ID list from the memory 102, stores the first unit ID of the unit ID list in the memory 102, changes the second unit ID to the first unit ID, and stores the unit ID list in the memory 102. As a result, the second and subsequent unit IDs in the unit ID list are advanced by one position. Then, the processing proceeds to step S809.

In step S809, the CPU 101 determines a tab for the expansion unit corresponding to the first unit ID of the unit ID list taken out in step S808. More specifically, the CPU 101 reads the first unit ID from the memory 102 and reads a unit-ID-to-tab-name conversion table from the nonvolatile memory 103. The unit-ID-to-tab-name conversion table is a table for converting a unit ID into the corresponding tab name.

Figure 9:
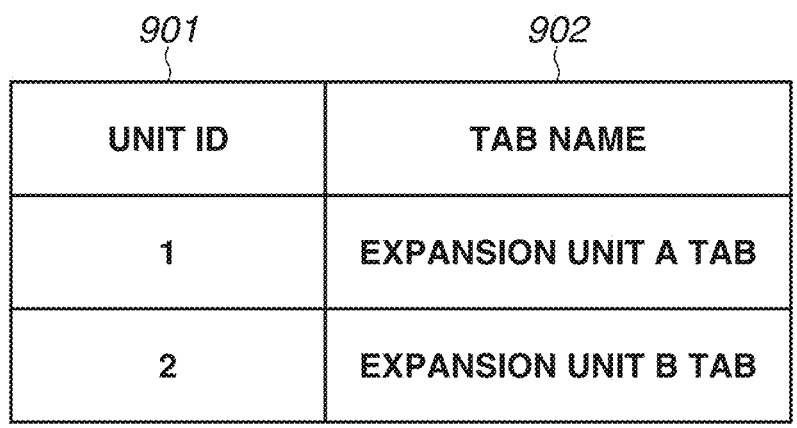
FIG. 9 illustrates an example of a unit-identifier (ID)-to-tab-name conversion table.

FIG. 9 illustrates an example of a unit-ID-to-tab-name conversion table.

As illustrated in FIG. 9, the unit-ID-to-tab-name conversion table includes a unit ID column 901 and a tab name column 902. The unit ID column 901 includes the unit ID corresponding to each expansion unit. The tab name column 902 includes the tab name corresponding to the unit ID in the same row. The CPU 101 then compares the unit ID in the unit ID column in the unit-ID-to-tab-name conversion table with the first unit ID. When the CPU 101 finds a matched unit ID, the CPU 101 determines the tab name stored in the tab name column 902 in the same row, as the tab name corresponding to the first unit ID. The CPU 101 then writes the tab corresponding to the first unit ID in the memory 102, and the processing proceeds to step S810.

In step S810, the CPU 101 draws the tab determined in step S809 at the end of the tab sequence in the menu screen. More specifically, the CPU 101 instructs the image processing unit 104 to read the tab name corresponding to the first unit ID from the memory 102 and then draw a rectangle with the corresponding icon arranged at the center, at the end position of the tab sequence. The processing then returns to step S807.

In step S811, the CPU 101 performs tab change processing. The tab change processing will be described in detail below with reference to the flowchart illustrated in FIG. 10.

Figure 10:
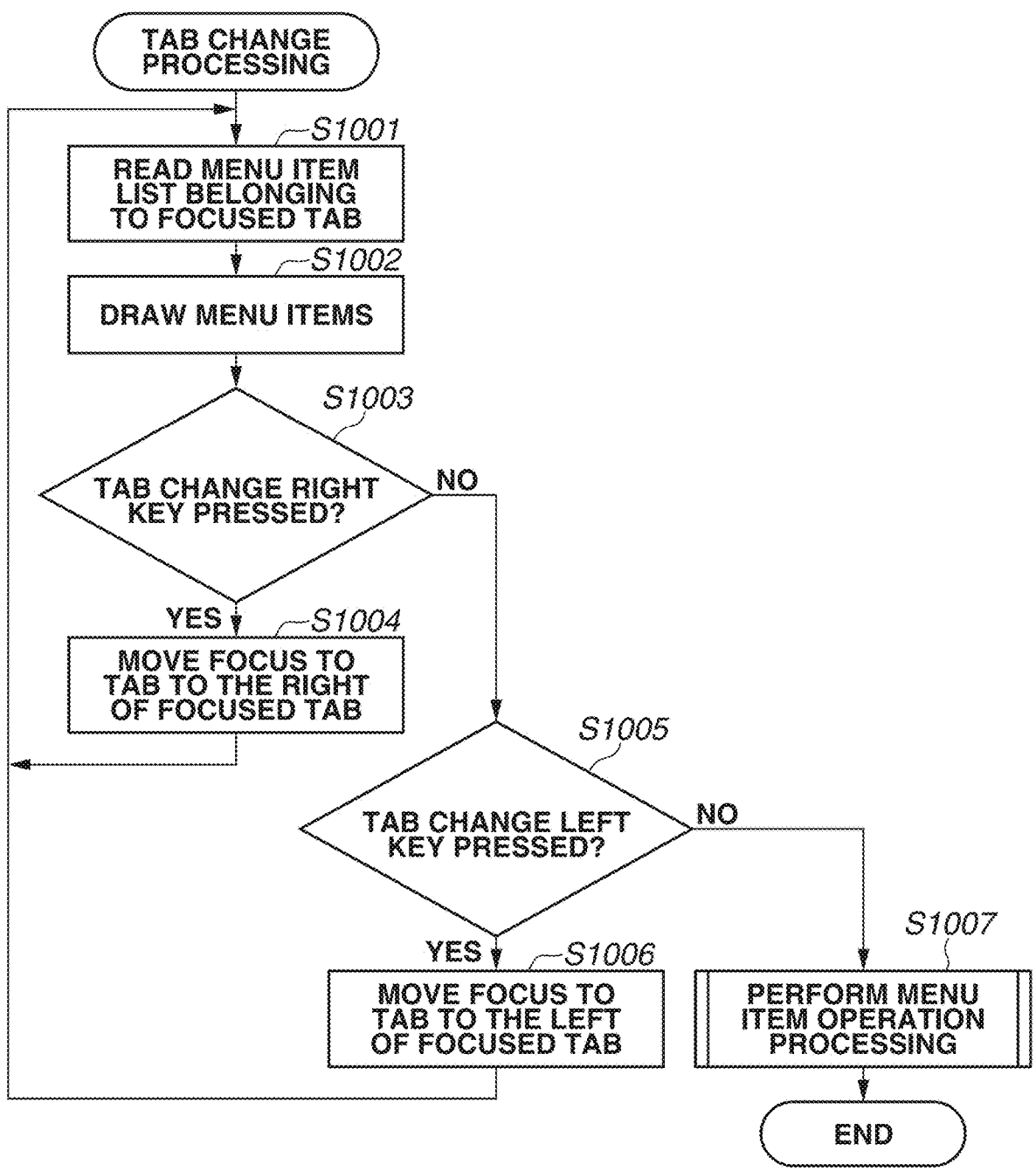
FIG. 10 is a flowchart illustrating a flow of tab change processing.

FIG. 10 is a flowchart illustrating processing to be performed by the CPU 101, more specifically, processing for changing the focused tab when the user presses the tab change left key or tab change right key via the operation unit 106, and processing for drawing menu items belonging to the focused tab.

In step S1001, the CPU 101 reads the menu item list belonging to the focused tab. More specifically, the CPU 101 reads a tab-name-and-menu-item-list correspondence table from the nonvolatile memory 103. The tab-name-and-menu-item-list correspondence table describes the correspondence between the tab name and the menu item list corresponding to the tab name.

Figure 11:
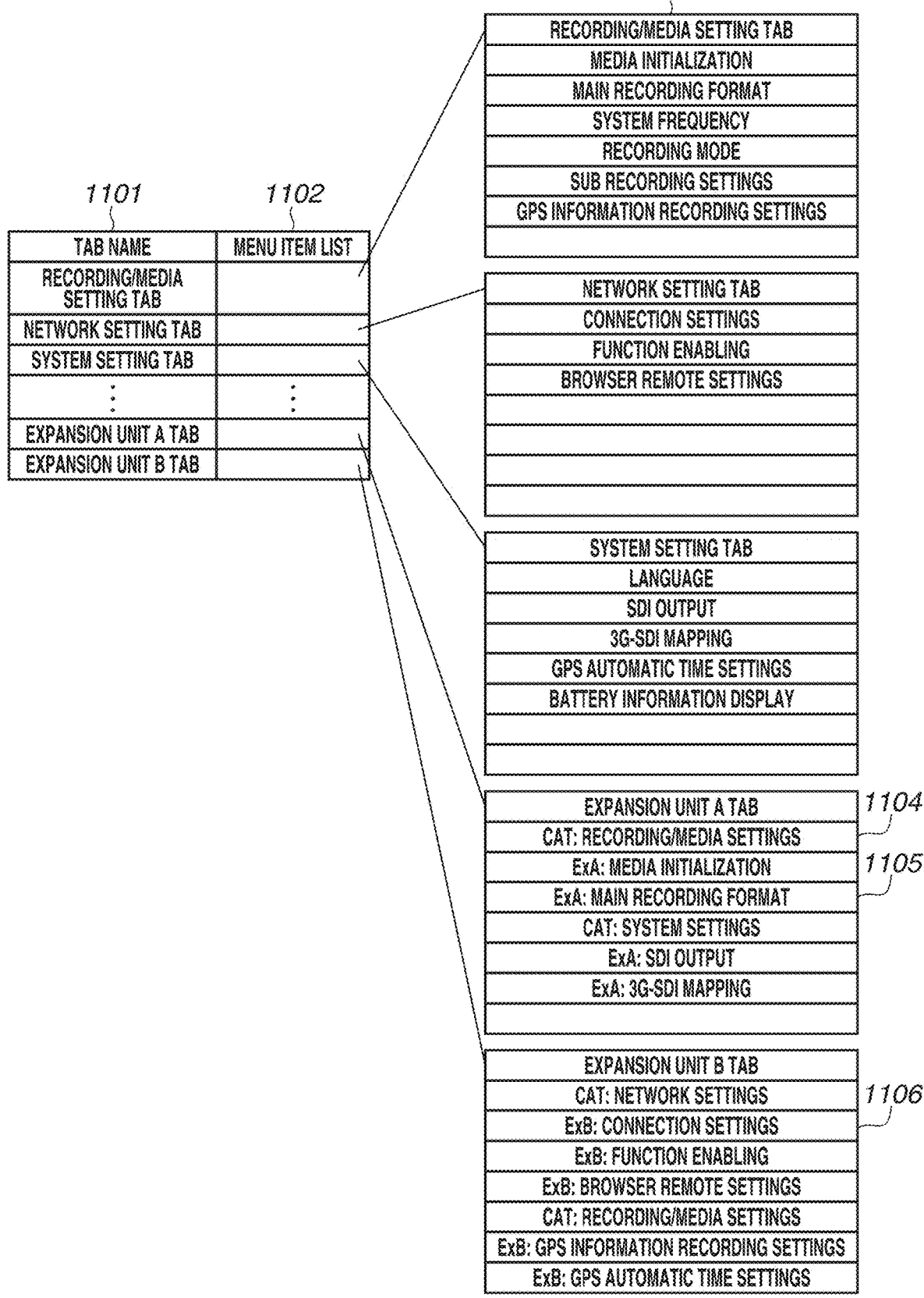
FIG. 11 illustrates an example of a tab-name-and-menu-item-list correspondence table.

FIG. 11 illustrates an example of the tab-name-and-menu-item-list correspondence table.

The tab-name-and-menu-item-list correspondence table illustrated in FIG. 11 includes a tab name column 1101 and a menu item list column 1102. The tab name column 1101 stores each tab name. The menu item list column 1102 stores a menu item list 1103 corresponding to the tab name in the same row. According to the present exemplary embodiment, the menu item list 1103 includes the recording/media setting tab, the network setting tab, the system setting tab, the expansion unit A tab, and the expansion unit B tab. For example, some of the menu items corresponding to an expansion unit tab are supplied with "CAT:" at the top of the item, as in a menu item 1104. "CAT:" is not a menu item but indicates the group of the following menu items until another "CAT:" appears. When a menu item is drawn, the portion excluding "CAT:" is drawn as a label. In addition, some menu items are supplied with "ExA:" at the top of the item, as in a menu item 1105. "ExA:" indicates a menu item corresponding to the expansion unit A. When a menu item is drawn, the portion excluding "ExA:" is drawn as a menu item. This also applies to "ExB:", as in a menu item 1106, except that "ExB:" indicates a menu item corresponding to the expansion unit B. The CPU 101 then compares the tab name column 1101 with the tab name of the currently focused tab. When the CPU 101 finds a matched tab name in the tab name column 1101, the CPU 101 reads the menu item list stored in the menu item list column 1102 in the same row including the matched tab name and writes the list in the memory 102. The processing then proceeds to step S1002.

In step S1002, the CPU 101 draws menu items based on the menu item list read in step S1001. More specifically, the CPU 101 instructs the image processing unit 104 to read the menu item list from the memory 102 and then draw character strings indicating the menu items included in the list. The processing then proceeds to step S1003.

In step S1003, the CPU 101 determines whether the tab change right key of the operation unit 106 is pressed by the user. If the CPU 101 determines that the tab change right key is pressed (YES in step S1003), the processing proceeds to step S1004. If the CPU 101 determines that the tab change right key is not pressed (NO in step S1003), the processing proceeds to step S1005.

In step S1004, the CPU 101 moves the focus to the tab to the right of the focused tab. More specifically, the CPU 101 instructs the image processing unit 104 to normally draw the currently focused tab and highlight the tab on the right of the focused tab. When the currently focused tab is the tab at the rightmost position, the CPU 101 performs no operation. The processing then returns to step S1001.

In step S1005, the CPU 101 determines whether the tab change left key of the operation unit 106 is pressed by the user. If the CPU 101 determines that the tab change left key is pressed (YES in step S1005), the processing proceeds to step S1006. If the CPU 101 determines that the tab change left key is not pressed (NO in step S1005), the processing proceeds to step S1007.

In step S1006, the CPU 101 moves the focus to the tab to the left of the focused tab. More specifically, the CPU 101 instructs the image processing unit 104 to normally draw the currently focused tab and highlight the tab to the left of the focused tab. When the currently focused tab is the tab at the leftmost position, the CPU 101 performs no operation. The processing then returns to step S1001.

In step S1007, the CPU 101 performs menu item operation processing. The tab change processing will be described in detail below with reference to the flowchart illustrated in FIG. 12.

Figure 12:
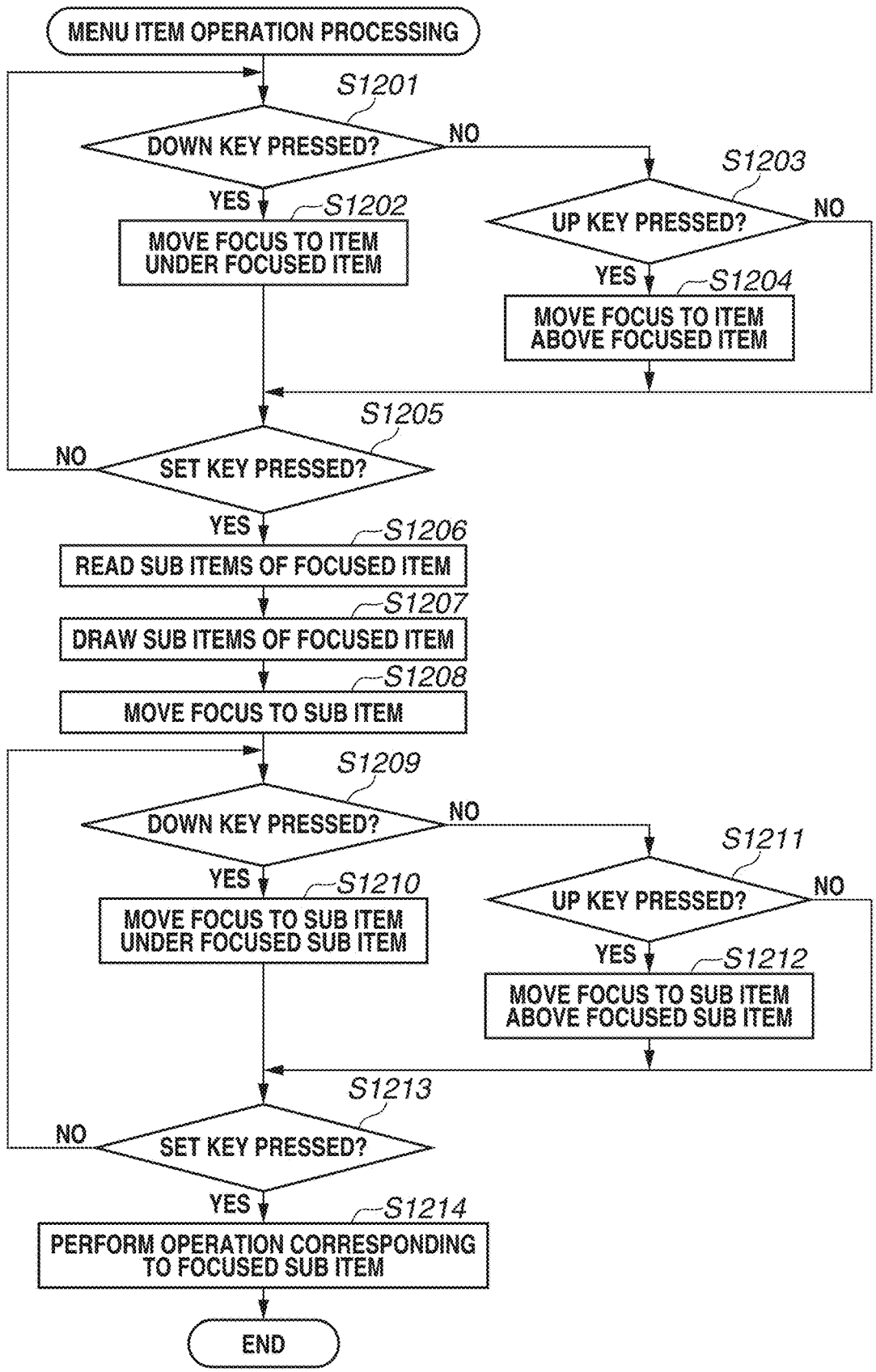
FIG. 12 is a flowchart illustrating a flow of menu item operation processing.

FIG. 12 is a flowchart illustrating processing to be performed by the CPU 101, more specifically, processing for changing the focused menu item when the user presses the up or down key of the operation unit 106, and processing for performing the operation corresponding to the focused item when the user presses the SET key.

In step S1201, the CPU 101 determines whether the down key of the operation unit 106 is pressed. If the CPU 101 determines that the down key is pressed (YES in step S1201), the processing proceeds to step S1202. If the CPU 101 determines that the down key is not pressed (NO in step S1201), the processing proceeds to step S1203.

In step S1202, the CPU 101 moves the focus to the menu item below the currently focused menu item. More specifically, the CPU 101 instructs the image processing unit 104 to erase the cursor drawn on the left of the currently focused menu item and then draw the cursor on the left of the menu item below the currently focused menu item. When the currently focused menu item is the menu item at the bottom position, the CPU 101 performs no operation. The processing then proceeds to step S1205.

In step S1203, the CPU 101 determines whether the up key of the operation unit 106 is pressed by the user. If the CPU 101 determines that the up key is pressed (YES in step S1203), the processing proceeds to step S1204. If the CPU 101 determines that the up key is not pressed (NO in step S1203), the processing proceeds to step S1205.

In step S1204, the CPU 101 moves the focus to the menu item above the currently focused menu item. More specifically, the CPU 101 instructs the image processing unit 104 to erase the cursor drawn on the left of the currently focused menu item and then draw the cursor on the left of the menu item above the currently focused menu item. When the currently focused menu item is the menu item at the top position, the CPU 101 performs no operation. The processing then proceeds to step S1205.

In step S1205, the CPU 101 determines whether the SET key of the operation unit 106 is pressed by the user. If the CPU 101 determines that the SET key is pressed (YES in step S1205), the processing proceeds to step S1206. If the CPU 101 determines that the SET key is not pressed (NO in step S1205), the processing returns to step S1201.

In step S1206, the CPU 101 reads the sub item list belonging to the currently focused menu item. More specifically, the CPU 101 reads a menu-item-and-sub-item-list correspondence table from the nonvolatile memory 103. The menu-item-and-sub-item-list correspondence table describes the correspondence between the menu item and the sub item list corresponding to the menu item.

Figure 13:
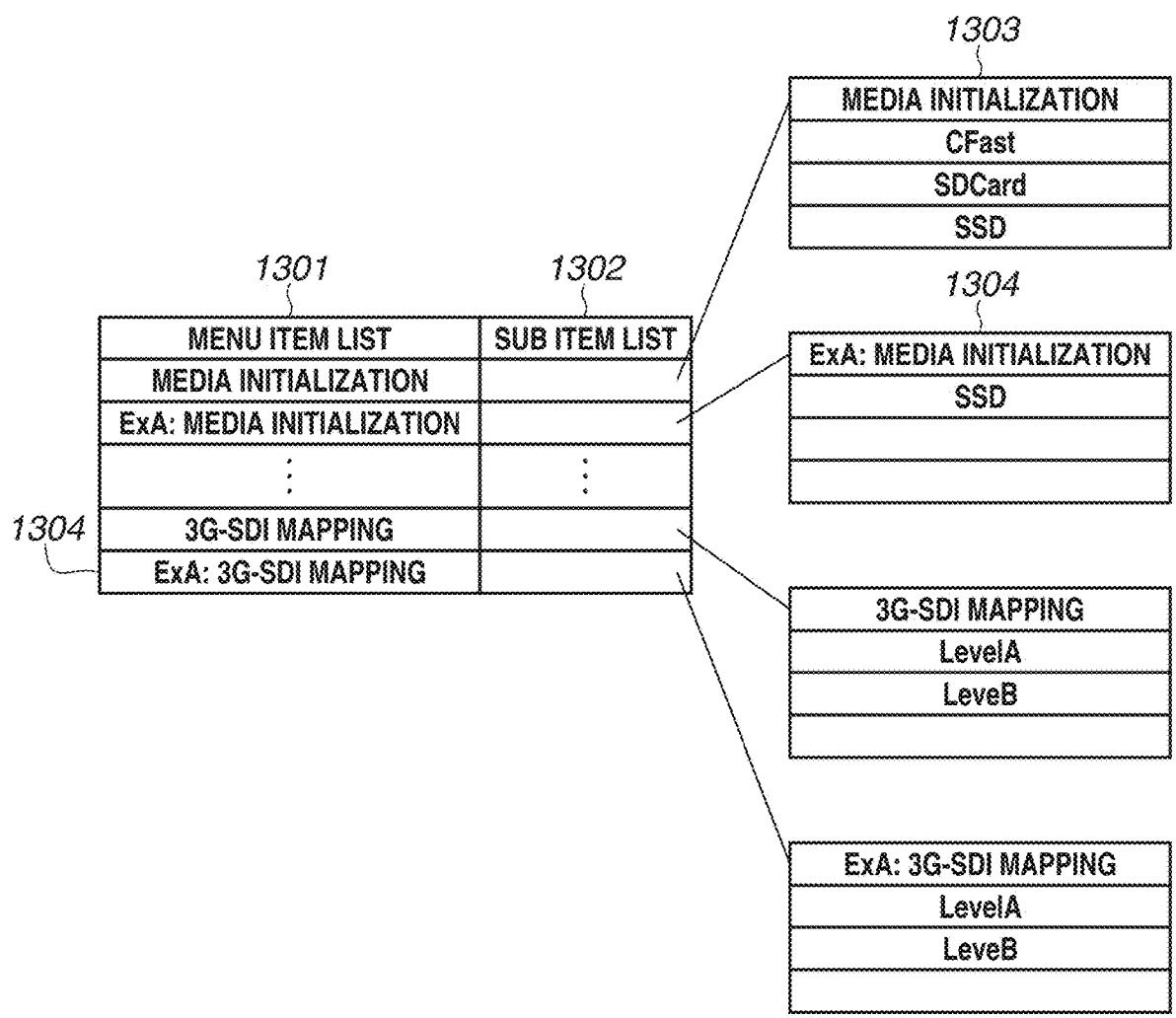
FIG. 13 illustrates an example of a menu-item-and-sub-item-list correspondence table.

FIG. 13 illustrates an example of the menu-item-and-sub-item-list correspondence table.

The menu-item-and-sub-item-list correspondence table includes a menu item column 1301 and a sub item list column 1302. The menu item column 1301 stores each menu item. The sub item list column 1302 stores sub item lists 1303 corresponding to the menu item in the same row. The sub item lists 1303 include sub items "media initialization", "ExA: media initialization", "3G-SDI mapping", and "ExA: 3G-SDI mapping". As illustrated in FIG. 11, sub items supplied with "ExA:" in the top of the item, as in a sub item 1304, out of the sub item lists 1303, are menu items corresponding to the expansion unit A and are distinguished from menu items without "ExA:". The CPU 101 then compares the menu item column 1301 with the currently focused menu item. When the CPU 101 finds a matched menu item in the menu item column 1301, the CPU 101 reads the sub item list stored in the sub item list column 1302 in the same row including the matched menu item and writes the list in the memory 102. The processing then proceeds to step S1207.

In step S1207, the CPU 101 draws sub items of the currently focused menu item. More specifically, the CPU 101 instructs the image processing unit 104 to read a sub item list from the memory 102 and then draw character strings indicating the sub items included in the list. The CPU 101 further instructs the image processing unit 104 to erase menu items other than the currently focused menu item. The processing then proceeds to step S1208.

In step S1208, the CPU 101 moves the focus to one of sub items. More specifically, the CPU 101 instructs the image processing unit 104 to erase the cursor displayed on the left of the currently focused menu item and then draw the cursor on the left of one of sub items. Although, there are some possible methods for determining which sub item the cursor is to be drawn on the left thereof, the cursor in this case can be drawn on the left of the sub item which had been last selected. The processing then proceeds to step S1209.

In step S1209, the CPU 101 determines whether the down key of the operation unit 106 is pressed by the user. If the CPU 101 determines that the down key is pressed (YES in step S1209), the processing proceeds to step S1210. If the CPU 101 determines that the down key is not pressed (NO in step S1209), the processing proceeds to step S1211.

In step S1210, the CPU 101 moves the focus to the sub item below the currently focused sub item. More specifically, the CPU 101 instructs the image processing unit 104 to erase the cursor drawn on the left of the currently focused sub item and then draw the cursor on the left of the sub item below the currently focused sub item. When the currently focused sub item is the sub item at the bottom position, the CPU 101 performs no operation. The processing then proceeds to step S1213.

In step S1211, the CPU 101 determines whether the up key of the operation unit 106 is pressed by the user. If the CPU 101 determines that the up key is pressed (YES in step S1211), the processing proceeds to step S1212. If the CPU 101 determines that the up key is not pressed (NO in step S1211), the processing proceeds to step S1213.

In step S1212, the CPU 101 moves the focus to the sub item above the currently focused sub item. More specifically, the CPU 101 instructs the image processing unit 104 to erase the cursor drawn on the left of the currently focused sub item and then draw the cursor on the left of the sub item above the currently focused sub item. When the currently focused sub item is the sub item at the top position, the CPU 101 performs no operation. The processing then proceeds to step S1213.

In step S1213, the CPU 101 determines whether the SET key of the operation unit 106 is pressed by the user. If the CPU 101 determines that the SET key is pressed (YES in step S1213), the processing proceeds to step S1214. If the CPU 101 determines that the SET key is not pressed (NO in step S1213), the processing returns to step S1209.

In step S1214, the CPU 101 performs the operation corresponding to the currently focused sub item. The processing then ends.

Processing to be performed by the CPU 201 of the expansion unit A200 and the CPU 301 of the expansion unit B300 will be described below with reference to the flowchart illustrated in FIG. 14. Since the processing performed by the CPU 201 of the expansion unit A200 and the processing performed by the CPU 301 of the expansion unit B300 are almost the same, only the processing to be performed by the CPU 201 of the expansion unit A200 will be described below as an example.

In step S1401, the CPU 201 determines whether a unit ID list request command is received from the main body side external I/F of the external I/F 207. If the CPU 201 determines that a unit ID list request command is received (YES in step S1401), the processing proceeds to step S1402. If the CPU 201 determines that a unit ID list request command is not received (NO in step S1401), the processing proceeds to step S1407.

In step S1402, the CPU 201 determines whether an expansion unit is connected to the expansion side external I/F of the external I/F 207. If the CPU 201 determines that an expansion unit is connected (YES in step S1402), the processing proceeds to step S1404. If the CPU 201 determines that an expansion unit is not connected (NO in step S1402), the processing proceeds to step S1403.

In step S1403, the CPU 201 reads the self unit ID from the nonvolatile memory 203 and transmits only this unit ID as a unit ID list to the apparatus connected to the main body side external I/F of the external I/F 207. The processing then ends.

In step S1404, the CPU 201 transmits a command to request for a unit ID list to the expansion unit connected to the expansion side external I/F of the external I/F 207. The processing then proceeds to step S1405.

In step S1405, the CPU 201 receives a unit ID list from the expansion unit connected to the expansion side external I/F of the external I/F 207 and writes the list in the memory 102. The processing then proceeds to step S1406.

In step S1406, the CPU 201 reads the unit ID list received in step S1405 from the memory 102, adds the self unit ID to the end of the unit ID list, and transmits the list to the apparatus connected to the main body side external I/F of the external I/F 207. The control apparatus 100 can obtain the order of connection of each expansion unit from the order in this unit ID list. The processing then ends.

In step S1407, the CPU 201 determines whether an expansion configuration change notification is received by the expansion side external I/F of the external I/F 207. If the CPU 201 determines that an expansion configuration change notification is received (YES in step S1407), the processing proceeds to step S1408. If the CPU 201 determines that that an expansion configuration change notification is not received (NO in step S1407), the processing proceeds to step S1409.

In step S1408, the CPU 201 transmits an expansion configuration change notification to the apparatus connected to the main body side external I/F of the external I/F 207. The processing then ends.

In step S1409, the CPU 201 determines whether the connection state of the expansion unit of the expansion side external I/F of the external I/F 207 has been changed. More specifically, in a case where the expansion unit connected to the expansion side external I/F of the external I/F 207 is disconnected or where an expansion unit is newly connected to the expansion side external I/F of the external I/F 207 in a state where no expansion unit has been connected thereto, the CPU 201 detects the event as a change of the connection state. If the CPU 201 detects a change of the connection state (YES in step S1409), the processing proceeds to step S1408. If the CPU 201 does not detect a change of the connection state (NO in step S1409), the processing ends.

The above-described processing of the flowchart illustrated in FIG. 14 is executed by all of the expansion units connected to the control apparatus 100. Thus, in a case where a request on a unit ID list from the control apparatus 100 is received, each of these expansion units can notify the control apparatus 100 of which expansion unit is connected in what order (connection configuration of expansion units). In a case where the above-described connection configuration of expansion units changes, each expansion unit can also notify the control apparatus 100 of the connection configuration of the expansion units in a similar way.

As described above, even in a case where connections of a plurality of expansion units are concurrently detected, the control apparatus 100 according to the present exemplary embodiment can uniquely determine the display positions of corresponding GUIs. When an expansion unit for expanding the functions and performance of the control apparatus 100 is connected to the control apparatus 100, the control apparatus 100 displays a tab for displaying menu items for performing a setting for the expansion unit, in the order according to the positional relation with respect to the control apparatus 100. This enables the user to easily grasp the correspondence between the expansion unit settings and the tabs. The present exemplary embodiment enables providing a control apparatus which makes it easier for the user to find a GUI corresponding to each individual external apparatus even if the user does not memorize the order of connection of the expansion units.

Although the present exemplary embodiment has been described above taking an example in which GUIs corresponding to expansion units are displayed as tabs on the menu screen, the present disclosure is not limited thereto. For example, it is also possible to display GUIs corresponding to expansion units as buttons and, when a button is selected or entered, display a GUI for performing the corresponding setting. It is also possible that the control apparatus 100 displays a layout drawing of the control apparatus 100 and expansion unit(s) as illustrated in FIGS. 4A to 4D and, when the user touches a portion corresponding to the control apparatus 100 or an expansion unit on the touch panel, displays a GUI for performing the corresponding setting.

Although, in the above-described exemplary embodiment, an apparatus having an imaging unit is used as a control apparatus as an example application of an information processing apparatus, the present disclosure is not limited thereto. The present exemplary embodiment is applicable to personal computers, tablet terminals, smart phones, portable game machines, and other diverse information terminals. The present exemplary embodiment is also applicable to digital single lens reflex cameras, mirrorless single lens cameras, compact digital cameras, camcorders, onboard cameras, monitoring cameras, medical cameras, and industrial cameras.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above-described exemplary embodiment, it is possible to display GUIs corresponding to the connected expansion units to a user in an easy-to-understand way.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-208207, filed Nov. 5, 2018, which is hereby incorporated by reference herein in its entirety.

What is claimed is:

1. An information processing apparatus comprising:
a connector configured to connect a plurality of expansion units for expanding a function of the information processing apparatus to the information processing apparatus in series;
a detector configured to detect a connection position of each of the plurality of expansion units in a connection pattern;
a display configured to display a graphical user interface for performing a setting related to a function expanded by each of the plurality of expansion units; and
a controller configured to control display contents of the graphical user interface to be displayed on the display based on the connection position of each of the plurality of expansion units in the connection pattern,
wherein, based on the connection position of at least one of the plurality of expansion units, the controller controls a display position of a graphical user interface item corresponding to the at least one of the plurality of expansion units in the graphical user interface,
wherein, in displaying a menu, the controller displays at least one of a tab, an icon, a character string, and a button as the graphical user interface item to be selected by a user to provide an instruction to display a menu item group related to one of the plurality of expansion units,
wherein the controller displays a menu item group related to at least one of the plurality of expansion units also in the menu item group related to a setting of the function of the information processing apparatus,
wherein, in a case where a common menu item exists between the menu item group related to at least one of the plurality of expansion units and the menu item group related to the setting of the function of the information processing apparatus, the controller displays:
only a sub item related to the at least one of the plurality of expansion units out of sub items of the common menu item in a case where the common menu item is accessed from the menu item group related to the at least one of the plurality of expansion units, and
all the sub items of the common menu or only a sub item related to the information processing apparatus out of the sub items of the common menu item in a case where the common menu item is accessed from the menu item group related to the setting of the function of the information processing apparatus.

2. The information processing apparatus according to claim 1, wherein the detector receives, from at least one of the plurality of expansion units, a list indicating a unit identifier assigned to distinguish the at least one of the plurality of expansion units and a type of the at least one of the plurality of expansion units, and detects the connection position of the at least one of the plurality of expansion units based on the unit identifier.

3. The information processing apparatus according to claim 2, wherein, based on the order of the unit identifier in the list, the detector detects the connection position of at least one of the plurality of expansion units.

4. The information processing apparatus according to claim 1, wherein the controller includes a table indicating the graphical user interface item corresponding to at least one of the plurality of expansion units, and performs control to read the graphical user interface item corresponding to the at least one of the plurality of expansion units from the table and display the graphical user interface item at the display position.

5. The information processing apparatus according to claim 1, wherein, in a case where the detector receives an expansion configuration change notification from one of the plurality of expansion units, the controller performs control to change the display contents of the graphical user interface in response to the expansion configuration change notification.

6. The information processing apparatus according to claim 1, wherein, in a case where the connection position where the at least one of the plurality of expansion units is connected in series is detected by the detector, the controller controls the display position of the graphical user interface item based on a connection order thereof in series.

7. The information processing apparatus according to claim 1, wherein the controller performs control to collectively display the graphical user interface item for each of the plurality of expansion units.

8. The information processing apparatus according to claim 1, wherein, in a layout drawing including the information processing apparatus and one of the plurality of expansion units, the controller displays a symbol representing the information processing apparatus or the one of the plurality of expansion units, as the graphical user interface item.

9. The information processing apparatus according to claim 1, wherein, in displaying the menu item group related to at least one of the plurality of expansion units, the controller separately displays menu items by category and displays a display item indicating the category thereof in the vicinity of the menu items.

10. The information processing apparatus according to claim 1, wherein the performing of the setting related to the function expanded by the plurality of expansion units includes executing the function, checking a state of the function or performance, and changing the function or performance.

11. The information processing apparatus according to claim 1, further comprising an imaging unit configured to capture images.

12. The information processing apparatus according to claim 1, wherein the information processing apparatus is a mobile apparatus.

13. The information processing apparatus according to claim 1, wherein the controller provides a gap between a tab of a menu item group related to a setting of the function of the information processing apparatus and a tab of the menu item group related to at least one of the plurality of expansion units.

14. The information processing apparatus according to claim 1, wherein, in a case where the controller displays a menu item group, the controller also displays a label of the menu item group.

15. A method for controlling an information processing apparatus, the method comprising:
- connecting a plurality of expansion units for expanding a function of the information processing apparatus to the information processing apparatus in series;
- detecting a connection position of each of the plurality of expansion units in a connection pattern;
- displaying a graphical user interface for performing a setting related to a function expanded by each of the plurality of expansion units;
- controlling display contents of the graphical user interface to be displayed on the display based on the connection position of each of the plurality of expansion units in the connection pattern;
- based on the connection position of at least one of the plurality of expansion units, controlling a display position of a graphical user interface item corresponding to the at least one of the plurality of expansion units in the graphical user interface;
- in displaying a menu, displaying at least one of a tab, an icon, a character string, and a button as the graphical user interface item to be selected by a user to provide an instruction to display a menu item group related to one of the plurality of expansion units;
- displaying a menu item group related to at least one of the plurality of expansion units also in the menu item group related to a setting of the function of the information processing apparatus; and
- in a case where a common menu item exists between the menu item group related to at least one of the plurality of expansion units and the menu item group related to the setting of the function of the information processing apparatus, displaying:
  - only a sub item related to the at least one of the plurality of expansion units out of sub items of the common menu item in a case where the common menu item is accessed from the menu item group related to the at least one of the plurality of expansion units, and
  - all the sub items of the common menu or only a sub item related to the information processing apparatus out of the sub items of the common menu item in a case where the common menu item is accessed from the menu item group related to the setting of the function of the information processing apparatus.

16. A non-statutory computer-readable medium storing a program for causing a computer to perform a method for controlling an information processing apparatus, the method comprising:
- connecting a plurality of expansion units for expanding a function of the information processing apparatus to the information processing apparatus in series;
- detecting a connection position of each of the plurality of expansion units in a connection pattern;
- displaying a graphical user interface for performing a setting related to a function expanded by each of the plurality of expansion units;
- controlling display contents of the graphical user interface to be displayed on the display based on the connection position of each of the plurality of expansion units in the connection pattern;
- based on the connection position of at least one of the plurality of expansion units, controlling a display position of a graphical user interface item corresponding to the at least one of the plurality of expansion units in the graphical user interface;
- in displaying a menu, displaying at least one of a tab, an icon, a character string, and a button as the graphical user interface item to be selected by a user to provide an instruction to display a menu item group related to one of the plurality of expansion units;
- displaying a menu item group related to at least one of the plurality of expansion units also in the menu item group related to a setting of the function of the information processing apparatus; and
- in a case where a common menu item exists between the menu item group related to at least one of the plurality of expansion units and the menu item group related to the setting of the function of the information processing apparatus, displaying:
  - only a sub item related to the at least one of the plurality of expansion units out of sub items of the common menu item in a case where the common menu item is accessed from the menu item group related to the at least one of the plurality of expansion units, and
  - all the sub items of the common menu or only a sub item related to the information processing apparatus out of the sub items of the common menu item in a case where the common menu item is accessed from the menu item group related to the setting of the function of the information processing apparatus.

* * * * *